United States Patent
Fernandez et al.

(10) Patent No.: US 7,152,211 B1
(45) Date of Patent: Dec. 19, 2006

(54) RESOLUTION INDEPENDENT THEMING

(75) Inventors: Roland L. Fernandez, Woodinville, WA (US); Christopher A. Evans, Sammamish, WA (US); Gregory L. Raiz, Bellevue, WA (US); Aaron B. Tinling, Seattle, WA (US); Louis Amadio, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 09/772,606

(22) Filed: Jan. 30, 2001

(51) Int. Cl.
*G06F 3/00* (2006.01)

(52) U.S. Cl. .................................................. 715/767

(58) Field of Classification Search ................ 345/765, 345/766, 767, 791, 764, 768, 744–747, 760, 345/660–671, 428, 471, 611–619, 441, 442, 345/419, 468, 606; 715/744–747, 788, 866, 715/502, 762, 764, 838, 700, 801, 815, 767; 382/237, 300; 348/745, 441; 358/1.9, 3.07

See application file for complete search history.

(56) References Cited

U.S. PATENT DOCUMENTS

| | | | | |
|---|---|---|---|---|
| 5,200,740 A | * | 4/1993 | Paxton et al. | 345/468 |
| 5,222,154 A | * | 6/1993 | Graham et al. | 382/162 |
| 5,241,653 A | * | 8/1993 | Collins et al. | 345/668 |
| 5,477,241 A | * | 12/1995 | Higgins et al. | 345/661 |
| 5,719,595 A | * | 2/1998 | Hoddie et al. | 345/611 |
| 5,857,067 A | * | 1/1999 | Hassett et al. | 345/469.1 |
| 5,859,648 A | * | 1/1999 | Moore et al. | 345/471 |
| 5,873,106 A | * | 2/1999 | Joseph | 715/506 |
| 5,917,549 A | * | 6/1999 | Simons et al. | 348/441 |
| 5,940,080 A | * | 8/1999 | Ruehle et al. | 345/611 |
| 5,943,063 A | * | 8/1999 | Dowling | 345/471 |
| 6,052,121 A | * | 4/2000 | Webster et al. | 345/733 |
| 6,175,372 B1 | * | 1/2001 | Ballard et al. | 345/470 |
| 6,297,837 B1 | * | 10/2001 | Bogdan | 715/801 |
| 6,330,007 B1 | * | 12/2001 | Isreal et al. | 345/762 |
| 6,369,851 B1 | * | 4/2002 | Marflak et al. | 348/173 |
| 6,421,054 B1 | * | 7/2002 | Hill et al. | 345/469 |
| 6,437,793 B1 | * | 8/2002 | Kaasila | 345/611 |
| 6,456,305 B1 | * | 9/2002 | Qureshi et al. | 715/800 |
| 6,504,552 B1 | * | 1/2003 | Phillips | 345/726 |
| 6,597,360 B1 | * | 7/2003 | Stamm et al. | 345/469 |
| 6,614,432 B1 | * | 9/2003 | Merrill | 345/428 |
| 6,816,166 B1 | * | 11/2004 | Shimizu et al. | 345/581 |

OTHER PUBLICATIONS

Fairhurst, A.M., et al., "The Effect of Visual Perception on the Required Performance of Imaging Systems", Journal of Modern Optics, vol. 47, No. 8, Jul. 2000, p. 1435-1446.

\* cited by examiner

*Primary Examiner*—Kristine Kincaid
*Assistant Examiner*—Lê Nguyen
(74) *Attorney, Agent, or Firm*—Amin, Turocy, & Calvin, LLP

(57) ABSTRACT

Several systems and associated methodologies are provided for rendering a themed image while mitigating pixelation and/or the disproportionate appearance thereof when the image is sized and/or scaled. The systems include at least one sizing module adapted to size components of a themed UI element. The systems also include at least one alignment module adapted to align at least one second component of a UI element within a first component of a UI element. The sizing modules are adapted to size the components with nine grid methodologies or based upon the ratio of the DPI of the context that the UI element is being rendered to the DPI that at least one of the components was designed under.

45 Claims, 18 Drawing Sheets

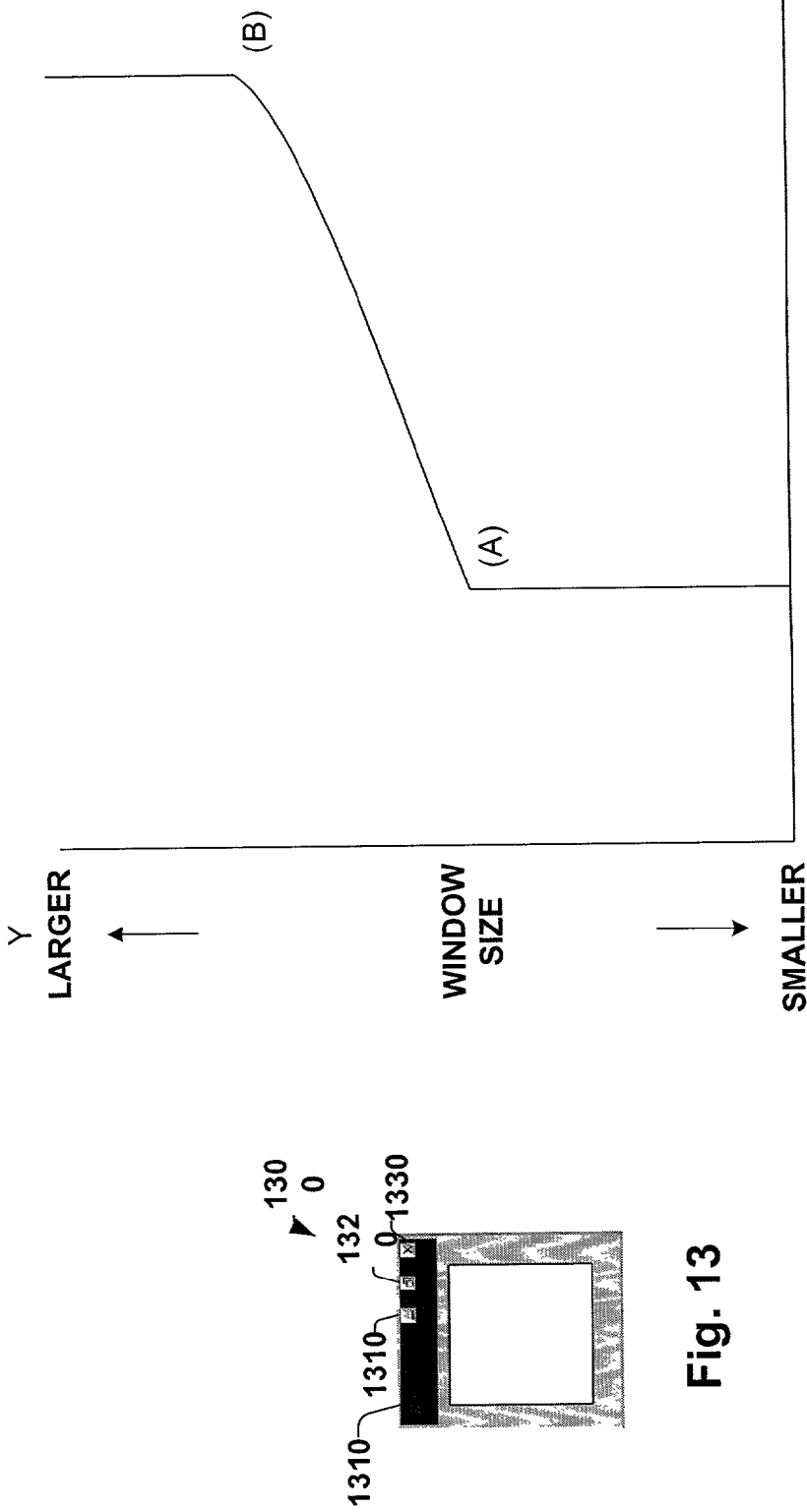

RESOLUTION INDEPENDENT THEMING

TECHNICAL FIELD

The present invention generally relates to computer systems and the resolution of images, such as themed user interface (UI) elements, presented thereon. More particularly, the present invention provides for systems and/or methodologies, which mitigate pixelation and/or disproportionate appearance of themed images when the images are sized and/or scaled.

BACKGROUND OF THE INVENTION

The theme of a user interface (UI) element and/or control defines the overall look, feel and appearance of the element and/or control. UI elements can be designed to take on any number of themes. For instance, a UI element 1600 that can be themed is shown in FIG. 16. The UI element 1600 is a graphical image that can be designed to be rendered onto many types of context, such as a monitor of a computer. The UI element shown in FIG. 16 is an image that is designed to represent a rewind button that may appear during any of a number of applications carried out on the computer. A rewind button is merely one of any number of UI elements (e.g. control, control button, scrollbar, toolbar, combination box) that can be themed by a theme author.

Depending upon various factors, such as an intended user or target audience, the theme of the UI element can be designed to convey a desired look and feel. The theme of an image is a function of, among other things, the color, shade and texture used in the design of the image. As with most images, UI elements may be made up of one or more components. Such components may include glyphs. A glyph is simply one type of character of figure within an image. For instance, in the rewind button 1600 there is a first component, which is a rectangular background 1602 and a second component, which includes two triangles 1604, 1606 that point to the left. The triangles 1604, 1606 are glyphs and serve to enable the button 1600 to be identified as a rewind button.

To theme an image, one or more of the components that make up the image can themselves be designed with a theme by a theme author. For instance, the rewind button 1600 has a rather conservative theme wherein the background 1602 and the glyphs 1604, 1606 are simply black and white and are not filled in with shading or coloring. Alternatively, the same UI element 1700 illustrated in FIG. 17, is designed to have a somewhat more flashy theme. This flashy theme may be a consumer based theme that is intended to aesthetically appeal to consumers. In this theme, both the background 1702 and the glyphs 1704, 1706 are shaded with a light gray color. In this fashion, they appear to be made out of a polished chrome material.

It may be desirable to change the size of a themed UI element at times. Certain actions may make changing the size of themed UI element desirable. For example, when a computer is configured it may be desirable to adjust the size of a UI element based upon a particular configuration that the computer is set to. This may occur, for instance, where a control panel is accessed to adjust certain settings. For example, a window 1800 that may be displayed on a computer monitor is illustrated in FIG. 18. Three UI elements 1810, 1820 and 1830 are located in the upper right hand corner of the window 1800 and reside within a uniformly colored border 1840. The UI elements 1810, 1820 and 1830 can be associated with different functions, such as to minimize, shrink and close the window, respectively.

In FIG. 19, the same window 1900 is illustrated at a significantly reduced size. The three UI elements 1910, 1920 and 1930, however, have not been reduced in size. It is not uncommon for UI elements such as these, which are located in corner sections, to not be sized. As such, the size of these elements may seem out of proportion with respect to other elements and images.

Additionally, while the border 1940 has been reduced in size horizontally or in the X direction, the border 1940 has not been reduced in size vertically or in the Y direction. It is not uncommon for elements located near the top and bottom of such a window 1900 to only be sized in the X direction, but not in the Y direction. As such, the height or thickness of these elements may appear out of proportion with respect to other elements. Similarly, it is not uncommon for elements located near the sides of the window to only be sized in the Y, but not in the X direction. As such, the width of these elements may appear out of proportion with respect to other elements.

When the size of a themed UI element is altered, resolution of that image may be diminished. More particularly, as shown in FIG. 20, when the size of a themed UI element 2000 is changed (e.g. enlarged), one or more of the components, such as the glyphs 2004, 2006, that make up the UI element may lose resolution, such as by becoming pixelated. Pixelation often causes lines to appear jagged 2010, 2012. While the degree of pixelation 2010, 2012 shown in FIG. 20 may be exaggerated, those skilled in the art generally appreciate the effect of pixelation.

A loss of resolution, can be a function of, among other things, the format that the image is stored in. An image can be stored in the memory of a computer as a bitmap, a font, a scalable font or a vector format image (hereinafter "vector"). Bitmaps, fonts, scalable fonts and vectors are generally well known to those skilled in the art and therefore are not discussed in great detail. A bitmap 2100 that includes a representation of the letter A is shown in FIG. 21. Suffice it to say, in a simple case a bitmap contains a plurality of dots organized into rows 2110 and columns 2120 which form a grid. A bitmap representation of an image uses the grid of dots to represent the image. More particularly, each dot within the grid has a value assigned to it. The value assigned to each of the dots controls the appearance of each respective dot. For instance, the dots can have a value of 0 or 1. The dots that have a value of 0 are not turned on and do not appear darkened. The dots that have a value of 1 are turned on, however, and do appear darkened. Accordingly, in FIG. 21, the darkened dots define the letter A. Often additional information is associated with each of the dots to further control and enhance the appearance of the dots. For instance, additional values are commonly associated with each of the dots such that the dots have a particular color and/or are darkened to a greater or lesser degree. This can be used to effect the desired themed appearance of the image. The greater the number of dots, the greater the resolution of the image, however, more dots generally means that more information has to be stored in the computer (e.g. an increased number of 1's and 0's); this can put a strain on the memory capabilities and/or tax the storage capacity of a computer.

Bitmaps of an image are generally designed under a particular number of dots per inch (DPI). For instance, the letter A, shown in FIG. 21, is designed under a 9 DPI setting because there are nine dots within one inch. When a bitmap is rendered to some context, the dots of the bitmap generally correspond to the pixels of the context being rendered to (e.g. a printer or computer monitor). A pixel is the smallest element in the context rendered to. Pixels are the objects that are actually turned on or illuminated within the context to display an image. Accordingly, the size of the image can change depending upon the DPI that the image was designed under and the DPI of the context that the image is being rendered to. More particularly, when the DPI of the context being rendered to is the same as the DPI that the bitmap of the image was designed under, the size of the image is not affected. However, when the DPI that the bitmap of the image was designed under differs from the DPI of the context that the image is being rendered to, the size of the image can change. This is because the DPI of the bitmap is fixed. For instance, when a one inch image is designed under 200 DPI and is rendered to a 200 DPI context, the size of that image is not altered and that image appears as a one inch image. However, when that same one inch image which is designed under 200 DPI, is rendered to a 400 DPI context, the size of the image is altered and the image appears as only a one half inch image. The size of the image is reduced by half because it only takes half of the space of the 400 DPI context to accommodate the 200 pixels that make up the image. Therefore, the size of the image may need to be altered (e.g. stretched) to appear as its original one inch size. However, stretching the 200 DPI image across a 400 DPI context, can reduce the resolution of the image. This is because the 200 dots are spread across 400 pixels, instead of the intended 200 pixels. As such, this stretching can lead to pixelation and/or other types of undesirable results.

Instead of a bitmap, an image can be stored in the memory of a computer as a scalable font. A scalable font is essentially a specific instance of a vector. Vectors are discussed in further detail below. Scalable fonts require less information to be stored in the computer than a bitmap and therefore take up less space within the memory of a computer. However, scalable fonts require more processing to be performed by the computer prior to being rendered to a context. A font is a set of shapes, most often character shapes, that typically represent each character in an alphanumeric character set. These character shapes can, however, also include other shapes, such as glyphs. The font of a character set usually refers to some design characteristics common to characters within the set. For instance, each character of a particular font can have some common design characteristics, such as line thickness, typeface, bold, italics, etc. These characteristics can also be related to the theme of the characters. Different fonts typically have different design characteristics and are identifiable by a name, such as Courier, Times New Roman, Serif, etc. It is to be appreciated that each of the characters of a font can be stored as bitmaps. However, this may require a substantial amount of memory and storage capacity as each character is stored as a separate bitmap. Therefore, for each font, a plurality of bitmaps equal in number to the number of characters within that font usually need to be stored. The memory requirements of font based characters can increase dramatically as the number of different fonts increases.

Unlike a bitmapped font, each character shape in a scalable font is defined in terms of one or more outlines that define the shape of the character. The outlines are themselves created and defined by a set of points which are interconnected by a series of lines and curves. More particularly, the outlines are defined by a starting point and a subsequent move (e.g. via a particular line or curve) that is traversed to interconnect the starting point to the next point. This process is repeated in a predefined order until all of the points are sequentially interconnected by appropriate lines or curves. The points represent locations within a grid which is a two dimensional coordinate system whose x-axis describes movement in the horizontal direction and whose y-axis describes movement in the vertical direction.

As such, scalable font based shapes are templates or mathematical outlines for drawing each of the characters in the character set. The outlines are models for sizes of the characters within the font. The process of sequentially interconnecting the points is controlled by a set of instructions associated with the character. For instance, one set of instructions would be associated with the font for one of the glyphs shown in FIGS. 16 and 17. Executable subroutines known as hints can also be associated with the characters of a font. These subroutines can be executed as is necessary to adjust the outlines of the characters based upon the scaled size of the characters; this helps to ensure that the characteristics of the original design are preserved when the character is rendered at different sizes to different contexts.

Software, such as rasterizer programs, can be used to render a font based character to a context. When a font based character is desired, a first part of a rasterizer program known as an interpreter is activated. The interpreter interprets or follows the instructions for the desired character. The interpreter takes into account the size of the image and DPI of the context being rendered to and uses that information in conjunction with the instructions for that particular character to draw the outline of that character. In this fashion, the character is drawn according to the size and DPI of the context being rendered to.

Because the character is defined in terms of points within a grid which are sequentially interconnect by predefined lines and curves, the outline of the character can be converted into a bitmap so that it can be rendered to a context. Accordingly, a second part of a rasterizer program, known as a scan converter, can convert the outline of the character to a bitmap so that it can be rendered to a context. The scan converter superimposes a grid over the outline of the character. Values are assigned to the dots within the bitmap according to those pixels within the context that should be turned on in order to render the image of the character on the context.

As an alternative to scalable fonts, which are essentially specific instances of vectors, characters can also be defined as vectors. Vectors are mathematical and/or geometric formulas that define a character or image. Generally speaking, to scale a vector based image, only the coefficients of the geometric formula for that image need to be changed. Additional commands can also be associated with the formula for a vector based image. These commands usually control other aspects of the image, such as the shade, color and/or gradient (e.g. transition between one or more colors) of the image. These can also be used to tailor the theme of the vector based image. As a general rule, vector based images require less memory than bitmaps, but they still require some processing prior to being rendered to a context. This is particularly true where the vector based image is scaled. When a vector based image is scaled, the formula, or more appropriately the coefficients therein, that define the image are altered so that the image can be drawn appropriately. Since the equations that define vector based images are adjusted each time the images are sized, these images experience a minimal loss of resolution. However, vectors do have limitations. For instance, while vectors work well for graphics that are readily definable by mathematical formulas (e.g. circles, squares, rectangles), they can become very cumbersome when they are used to define images that are made up of intricate and ornate graphics. Additionally, because vectors only represent images drawn with mathematical formulas, in general vectors can not be used to represent reality based images, such as photographs. To render a vector based image to a context, software, such as the aforementioned rasterizer programs, can be implemented.

A loss of resolution can also be a function of the manner within which the size of the image is changed. For instance, if a bitmap of an image is altered and different portions of the bitmap are adjusted differently, different portions of the image may experience pixelation to a greater or lesser degree. For instance, if one part of an image, such as the middle of the window shown in FIGS. 13, 18 and 19 are altered more than the other parts of the image, then that part of the image may experience an inordinate amount of pixelation as compared to the rest of the image. Elements within the corner sections of the window, such as the UI elements 1810, 1820, 1830 may, for example, experience little or no pixelation. This may make the appearance of the rendered image worse than if the entire image were stretched equally. Additionally, if different portions of an image are adjusted differently, portions of the image (e.g., elements 1910, 1920, 1930) may appear out of proportion with respect to the rest of the image.

Conventional bitmap sizing methodology does not size all portions of a bitmap equally. Conventional bitmap sizing methodology is discussed with reference to FIG. 22. In conventional bitmap sizing methodology, a bitmap 2200 is divided up into nine sections or grids which usually include four corner sections 2202, 2206, 2214, and 2218, a middle section 2210, left 2208 and right 2212 side sections, and top 2204 and bottom 2216 sections. When the size of an image is changed, one or more of the nine sections are altered to increase or decrease the size of the image. Under conventional nine grid sizing methodologies, the size of each of the four corner sections 2202, 2206, 2214 and 2218 is usually preserved while the size of the middle section 2210 is increased or decreased in both the horizontal or X 2220 and vertical or Y 2222 directions, the size of the left 2208 and right 2212 side sections are only increased or decreased in the vertical 2224 direction and the size of the top 2204 and bottom 2216 sections are only increased or decreased in the horizontal 2226 direction.

Often, very little, if any, of the image to be sized is located within the four corner section of the bitmap as those sections typically contain information that is to remain the same size. In this case, while the image can appear pixelated, sizing the bitmap with nine grid methodologies does not cause parts of the image to appear disproportionate with respect to other parts of the image. Similarly, the entire bitmap is often filled in with a uniform texture, solid color or gradient (e.g. transition from one color to another). In this case, sizing the different sections of the bitmap differently, does not have a deleterious affect on the image because the solid color appears the same throughout every section of the bitmap regardless of the change to their size.

Conventionally, the manner and degree to which the size of each of the nine sections is altered is controlled by controlling the margins 2228 of the nine sections. For instance, a set of four numbers corresponding, respectively, to the margins 2228 of the nine sections (e.g. the non-sizable four corner sections 2202, 2206, 2214 and 2218, the vertically sizable side sections 2208, 2212, the horizontally sizable top 2204 and bottom 2216 sections and the bi-directionally sizable middle section 2210) may be varied to scale the image. By altering these numbers, margins 2228 of the nine grid are changed to alter each of the nine sections and thereby alter the size of the image. However, in accordance with the foregoing discussion, conventionally these numbers do not alter the size the nine sections uniformly.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention facilitates mitigation of the foregoing shortcomings. In particular, the present invention provides for several systems and/or methodologies which mitigate pixelation and/or the disproportionate appearance of themed images when the images are sized and/or scaled. The present invention allows a themed UI element to be scaled and rendered in a desired fashion while mitigating pixelation and/or disproportionate appearances.

According to one aspect of the present invention, a themed first component of a UI element can be appropriately sized and a correspondingly themed second component of a UI element can thereafter be inserted and aligned within the first component. In this aspect, the themed first component is substantially uniform or has a substantially uniform or homogenous fill or texture. Due to this make up of the themed first component, different portions of the themed first component can be scaled differently. The themed second component, which is to be aligned within the first component can be a bitmap, a font, a scalable font or a vector.

According to another aspect of the present invention, when the DPI of the context being rendered to differs from the DPI that a bitmap of a themed component of a UI element was designed under, the bitmap of the themed component is scaled based upon the DPI of the context being rendered to and the DPI that the themed component was designed under.

According to another aspect of the present invention, when the DPI of the context being rendered to differs from the DPI that a themed second component was designed under, an appropriate size of the themed second component, which is to be inserted within a themed first component of the UI element, can be chosen from a library containing the themed second component in a plurality of different sizes for the particular theme of interest. The choice is based upon a functional relationship between the DPI of the context being rendered to and the DPI that the themed second component was designed under.

To the accomplishment of the foregoing and related ends, certain illustrative aspects of the invention are described herein in connection with the following description and the annexed drawings. These aspects are indicative, however, of but a few of the various ways in which the principles of the invention may be employed. The present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 13 is a representation of a window displayable on a computer monitor with UI elements significantly reduced in size;

FIG. 14 is a graph illustrating a plot of window size versus the degree that themed UI elements are scaled in accordance with the present invention;

DETAILED DESCRIPTION OF THE INVENTION

Figure 1:
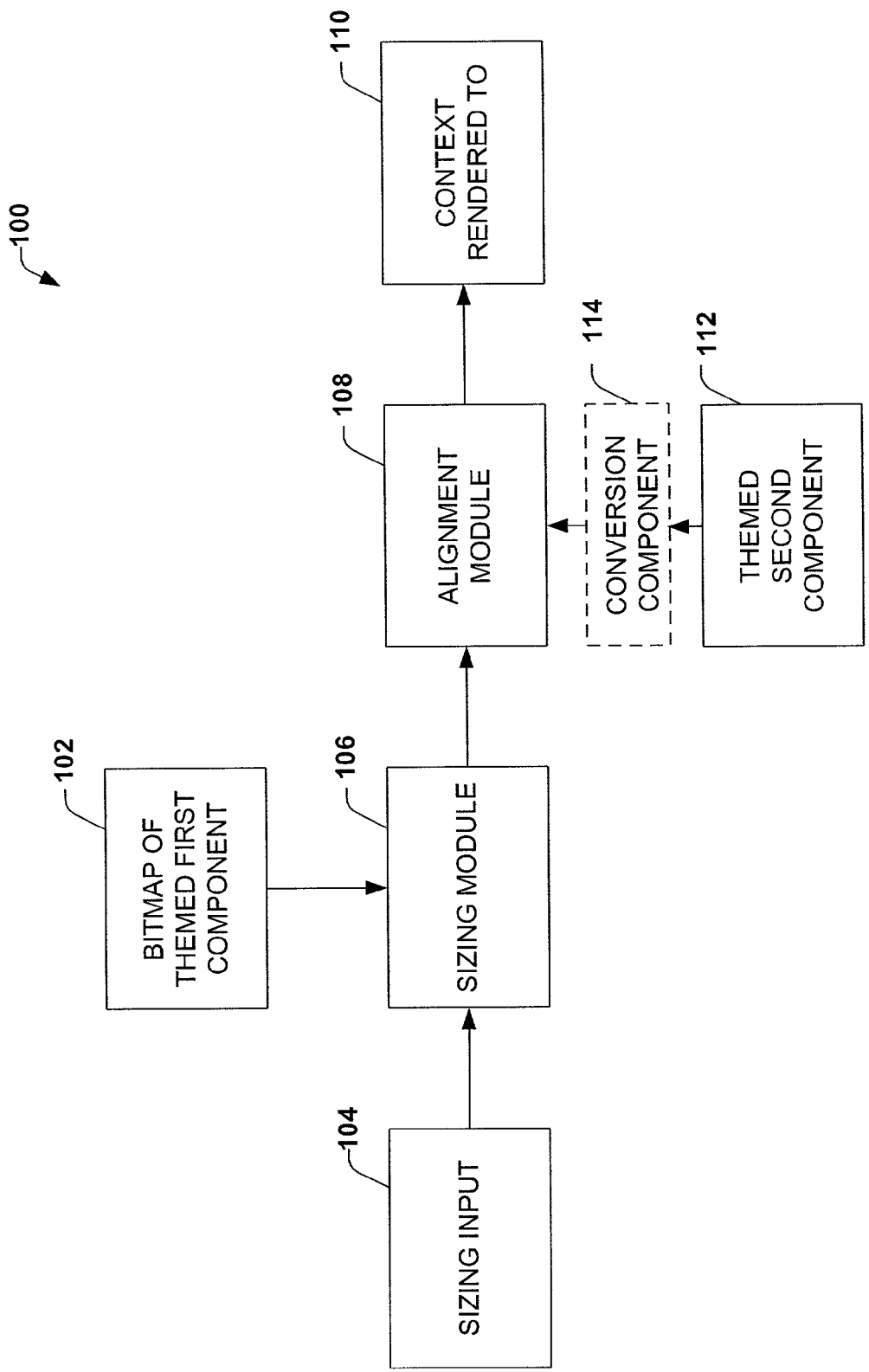
FIG. 1 is a block diagram illustrating a system for sizing a themed UI element in accordance with one aspect of the present invention.

The present invention is now described with reference to the drawings, wherein like reference numerals are used to refer to like elements throughout.

The present invention provides for systems and/or methodologies which mitigate pixelation and/or disproportionate appearance of images during scaling.

As used in this application, "system" is a structure comprising one or more modules. A "module" is a structure comprising computer hardware and/or software. For example, a module can be, but is not limited to, a computer readable memory encoded with software instructions or a computer configuration to carry out specified tasks. By way of illustration, both an application program stored in computer readable memory and a server on which the application runs can be module. Due to the nature of modules, multiple modules can be intermingled and are often not separated from one another. Systems can likewise be intermingled and inseparable. Likewise, it is to be appreciated that a module can be a software object.

With reference to FIG. 1, in accordance with one aspect of the present invention, a system 100 is schematically illustrated for rendering an appropriately sized themed UI element. In accordance with this aspect, sizing input 104 is provided to a sizing module 106. The sizing input 104 can be any type of input that affects the size of the UI element. The sizing input 104 may, for example, result from configuration related activities, such as where a control panel is accessed to adjust relevant settings.

In accordance with this aspect of the present invention, a bitmap of a themed first component 102 is also provided to the sizing module 106. Generally speaking, in this aspect, the themed first component is a substantially uniform image, however, it is to be appreciated that it may also have different attributes. Accordingly, the size of different sections of this bitmapped themed component can be sized differently with little or no pixelation and/or disproportionate appearances.

Figure 2:
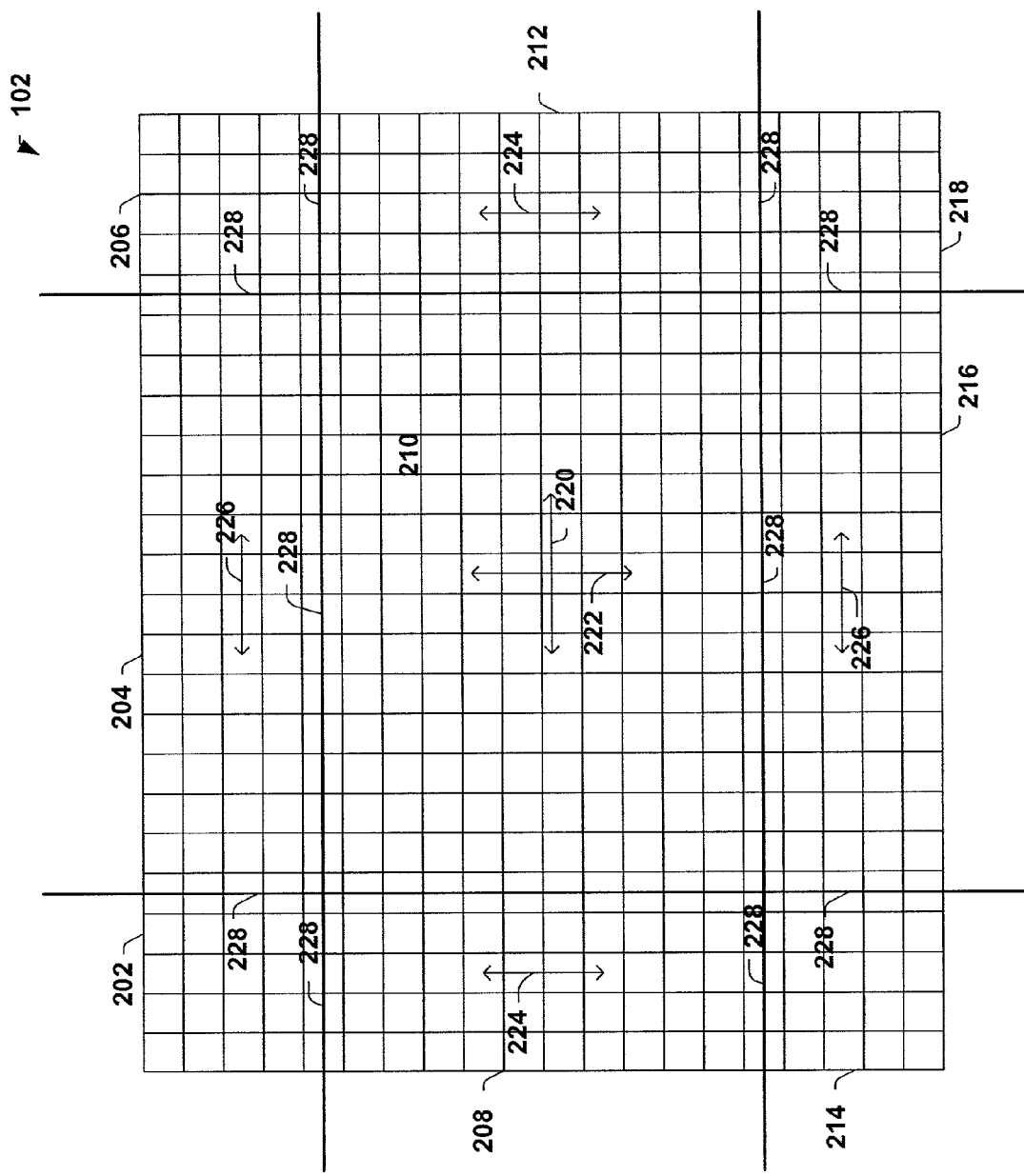
FIG. 2 is a bitmap that is divided into sections for purposes of illustrating sizing of the bitmap in accordance with one aspect of the present invention.

The sizing module 106 sizes the first component in accordance with the sizing input 104 by dividing the bitmap 102 into a plurality of sections. For instance, as shown in FIG. 2, the bitmap 102 of the themed first component can be divided into nine sections which include a middle section 210, four corner sections 202, 206, 214, 218, two side sections 208, 212 and a top 204 and bottom 216 section. In accordance with this aspect, sections of the bitmap are then sized by the sizing module 106. However, the respective sections do not need to be sized uniformly. For example, the middle section 210 can be sized in both horizontal 220 and vertical 222 directions, the size of the four corner sections can be preserved, the side sections 208, 212 can be adjusted in the vertical direction 224 only and the top 204 and bottom 216 sections can be sized in the horizontal 226 direction only. Since the image is compliant with the scaling techniques employed, this sizing methodology does not subject the first component to a substantial amount of pixelation or loss of resolution when it is stretched or compressed.

With reference to FIG. 2, the sizing module 106 adjusts the size of each of the sections of the bitmap by adjusting margins 228 of the sections. For instance, a set of four numbers corresponding, respectively, to the margins 228 of the nine sections (e.g. the non-sizable four corner sections 202, 206, 214 and 218, the vertically sizable side sections 208, 212, the horizontally sizable top 204 and bottom 216 sections and the bi-directionally sizable middle section 210)

may be varied by the sizing module to scale the image. By altering these numbers, margins 228 of the nine grid are changed to thereby alter the size of some of the sections. When the size of the sections are altered, the portion of the image therein can be stretched or tiled in any manner.

With reference back to FIG. 1, once the first component of the themed UI element is appropriately sized, it is provided to an alignment module 108. An appropriately themed second component 112 of the UI element is also provided to the alignment module 108. The second component is designed previously with the desired resolution. The alignment module 108 inserts and aligns the second component 112 within the first component 102. The alignment module 108 can align the second component 112 within the first component 102 in any number of ways. For example, the alignment component can align the second component 112 within the first component 102 by utilizing horizontal and vertical alignment control properties which control the horizontal and vertical alignment, respectively, of the second component 112 relative to the margins or borders of the first component 102.

So that the UI element has a desired look and feel, the second component 112 may have a theme that corresponds, or is at least complimentary, to the theme of the first component 102. However, it is to be appreciated that for the purposes of the present invention, the components described herein can have one or more themes or no themes. Additionally, the components need not have corresponding, or even complimentary themes. Rather, the components can have divergent themes. Essentially, the present invention is not limited by the theming of the components that make up the UI elements.

In accordance with this aspect, the second component 112 can be a bitmap, a font, a scalable font or a vector of the themed second component. It is to be appreciated that if the second component is a scalable font or a vector, a component, such as a conversion component 114 that includes raterization and scan converting software, may be juxtaposed between the second component 112 and the alignment module 108 to convert the scalable font into a bitmap which can then be aligned within the first component. It is to be appreciated that the conversion component 114 would only be utilized if the second component is a scalable font.

When the alignment module 108 aligns and inserts the themed second component within the themed first component 102, the appropriately sized themed UI element is generated and is sent to the context 110 that it is to be rendered to. Since the first component is uniform and therefore experiences little to no pixelation and/or disproportionate appearances and further because the second image is designed previously with the desired resolution, pixelation and/or disproportionate appearances of the rendered UI element is mitigated. It is to be appreciated that the present invention contemplates more than just first and second components making up a UI element. Accordingly, the present invention contemplates any number of themed components within a themed first component. Moreover, the present invention contemplates the placement of these components within the first component in any suitable fashion and suitable location.

Figure 3:
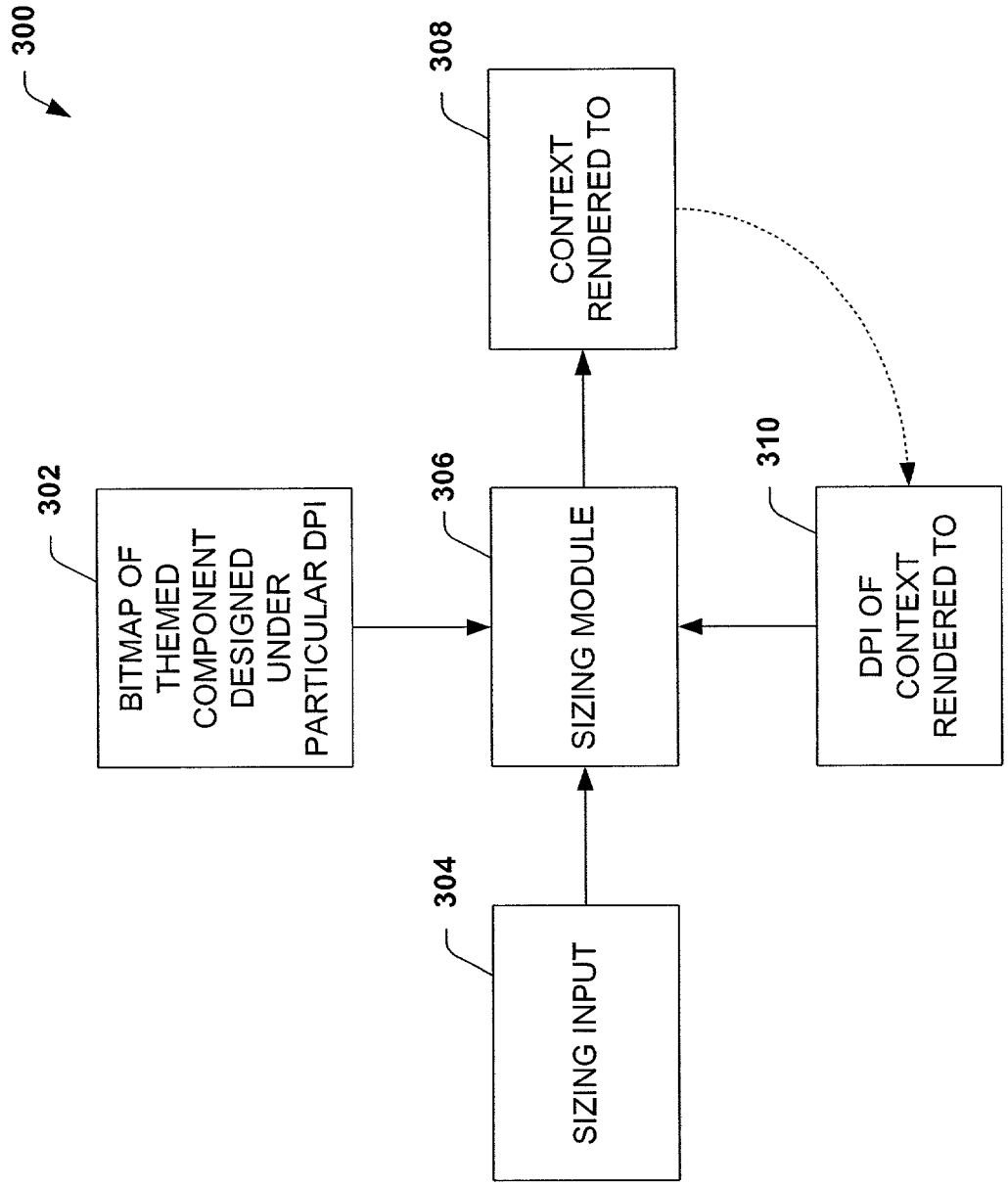
FIG. 3 is a block diagram illustrating a system for sizing a themed component in accordance with another aspect of the present invention.

With reference now to FIG. 3, in accordance with another aspect of the present invention, a system 300 is schematically illustrated for rendering an appropriately sized themed component of an image when the DPI that the themed component was designed under differs from the DPI of the context the image is being rendered to. It is to be appreciated that, for the purposes of simplicity and ease of understanding, this aspect of the present invention is only discussed with respect to a bitmap of a single component. However, it is to be appreciated that this aspect is equally applicable to a bitmap of a UI element that may contain any suitable number of components.

In accordance with this aspect, sizing input 304 is received by a sizing module 306. The sizing input 304 can be any type of input that affects the size of the themed component. The sizing input 304 may, for example, result from configuration related activities, such as where a control panel is accessed to adjust relevant settings.

In accordance with this aspect, a bitmap of the themed component 302 of an image is also received by the sizing module 306. The themed component 302 is designed under a particular DPI and that particular DPI is also fed into the sizing module 306 along with the bitmap of the themed component 302. Additionally, the DPI of the context that the themed component 302 is being rendered to is also fed into the sizing module 306. Since the DPI that the themed component 302 was designed under is different from the DPI 310 of the context 308 being rendered to, the sizing module 306 sizes the bitmap of themed component 302 based upon a functional relationship between the DPI 310 of the context 308 that the themed component 302 is being rendered to and the DPI that the themed component 302 was designed under. For instance, the sizing module 306 can size the bitmap of the themed component based upon the ratio of the DPI 310 of the context 308 that the themed component 302 is being rendered to to the DPI that the themed component 302 was designed under. It is to be appreciated that this can be any ratio and does not need to be merely a 1:1 ratio and that this can also be a geometric, rather than linear relationship. It is also to be appreciated that substantially every portion of the themed component is sized. Once the bitmap is sized, the themed component is output to the context 308 that it is to be rendered to.

Figure 4:
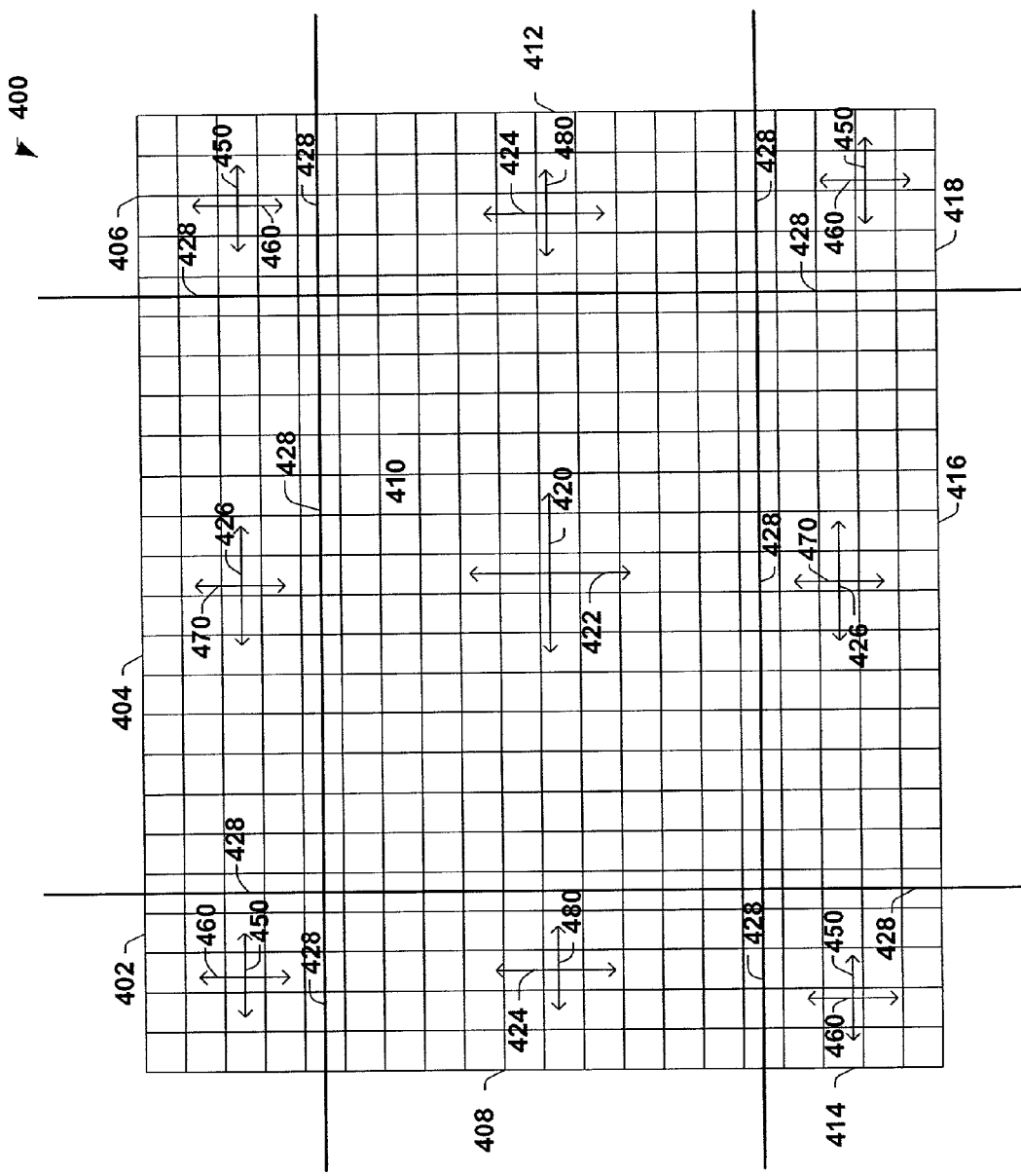
FIG. 4 is a bitmap that is divided into sections for purposes of illustrating sizing of the bitmap in accordance with another aspect of the present invention.

With reference to FIG. 4, the sizing module can size the first component in accordance with the sizing input by the dividing the bitmap into a plurality of sections. For instance, the bitmap of the themed first component can be divided into nine sections which include a middle section 410, four corner sections 402, 406, 414, 418, two side sections 408, 412, and a top 404 and bottom 416 section. In accordance with this aspect, the sections of the bitmap are sized to mitigate pixelation and/or disproportionate appearances. More particularly, the corner sections can be adjusted in both the horizontal or X 450 and vertical or Y 460 directions, the top 404 and bottom 416 sections to be adjusted in the vertical 470, rather than only the horizontal 426 direction, and the left 408 and right 412 side sections can be adjusted in the horizontal 480, rather than just the vertical 424, direction. Readjusting the sections in any or all directions mitigates disproportionate appearances of the components located therein that may occur as a result of scaling.

The sizing module can adjust the size of each of the sections of the bitmap by adjusting the margins 428 of the sections. For instance, a set of four numbers corresponding, respectively, to the margins 428 of the four corner sections 402, 406, 414 and 418, the vertically sizable side sections 408, 412, the horizontally sizable top 404 and bottom 416 sections and the bi-directionally sizable middle section 410 may be varied by the sizing module to scale the image. By altering these numbers, margins 428 of the nine grid are changed to thereby alter the size of the size of the sections. When the size of the sections are altered, the portion of the image therein can be stretched or tiled in any manner. The sizing module 406 can adjust the set of four numbers based upon the aforementioned DPI to DPI relationship. Since the bitmap of the component is sized in accordance with user input and to account for the DPI of the context being rendered to, the component is rendered having the effect of pixelation and/or disproportionate appearances mitigated.

Figure 5:
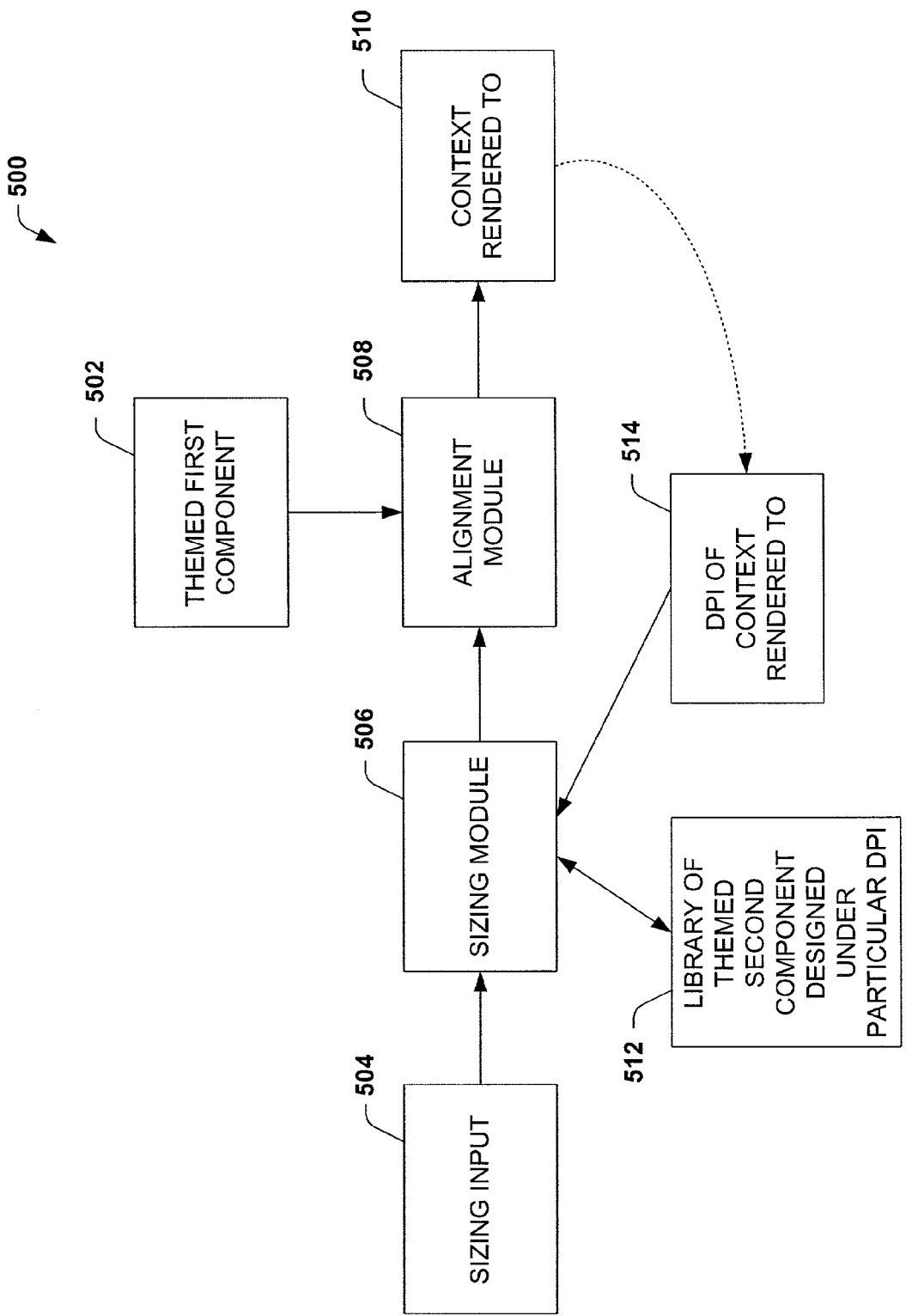
FIG. 5 a is block diagram illustrating a system for sizing a UI element in accordance with another aspect of the present invention.

With reference now to FIG. 5, in accordance with another aspect of the present invention, a system 500 is schematically illustrated for rendering an appropriately sized themed UI element when the DPI of the context being rendered to is different from the DPI that a second component of the themed UI element was designed under. Sizing input 504 is received by a sizing module 506. The sizing input 504 can be any type of input that affects the size of the UI element. The sizing input 504 may, for example, result from configuration related activities, such as where a control panel is accessed to adjust pertinent settings.

The themed second components in the library 512 are designed under a particular DPI and that particular DPI is also received by the sizing module 506. For one particular theme, the library contains different sizes of the same themed second component. In accordance with this aspect, the DPI 514 of the context 510 being rendered to is also received by the sizing module 506. To appropriately size the themed component, the sizing module 506 determines what size second component to pull from the library 512 based upon a functional relationship between the DPI of the context 510 that the themed UI element is being rendered to and the DPI that each of the entries within the library were designed under. For instance, the sizing module can determine what size themed second component to pull from the library based upon the ratio of the DPI 514 of the context 510 that the UI element is being rendered to to the DPI that the entries within the library 512 were designed under. It is to be appreciated that this can be any ratio and does not need to be merely a one to one ratio and can even be a geometric, rather than a linear, type of relationship.

Assume, for purposes of illustration only, that there are five different sizes of the themed second component stored within the library 512. Each of these components can have a number associated with it (e.g. 1–5). The numbers associated with the components can correspond to and thereby index the relative size of the components (e.g. the number 5 can be associated with the largest themed second component). The sizing module 506 can choose the appropriate size component by selecting the component whose associated number is closest to, but not greater than, the aforementioned ratio. For instance, if the DPI 514 of the context 510 being rendered to is 200 DPI and the DPI that each of the differently sized second components within the library 512 were designed under is 96 DPI, the ratio of the two (e.g. 200/96) is just greater than two. Accordingly, the sizing module 506 can pull the size of the themed second component from the library 512 that has the number 2 associated with it. In this fashion, the themed second component can be sized according to the sizing input 504 while accounting for the DPI of the context being rendered to.

Once the appropriate size of the themed second component is obtained, it is provided to an alignment module. An appropriately themed first component 502 of the UI element is also provided to the alignment module. The alignment module inserts and aligns the sized second component within the first component. The alignment module 508 can align the second component within the first component in any number of ways. For example, the alignment component can align the second component within the first component 502 by utilizing horizontal and vertical alignment properties which control the horizontal and vertical alignment, respectively, of the second component relative to the margins or borders of the first component.

So that the UI element has a desired look and feel, the first and second components may very well have corresponding, or at least complimentary, themes. However, it is to be appreciated that for the purposes of the present invention, the components described herein can have one or more themes or no themes. Additionally, the components need not have corresponding, or even complimentary themes. Rather, the themes can have divergent themes. Essentially, the present invention is not to be limited by the theming of the components that make up the UI element.

When the alignment module 508 aligns and inserts the themed second component within the themed first component 502, the appropriately sized themed UI element is generated and is sent to the context 510 that it is to be rendered to. Because the entries in the library are designed in advance with the desired resolution, and because an entry is chosen from the library based upon the DPI to DPI ratio, the appropriately sized UI element is rendered with the effect of pixelation and/or disproportionate appearances mitigated. It is to be appreciated that the different sizes of the themed second component can be stored within the library 512 as bitmaps or fonts where each bitmap or font contains one size of the themed second component. It is to be appreciated that the present invention anticipates more than just first and second components making up the UI element. Accordingly, the present invention anticipates any number of libraries that each contain any number of differently sized themed components. Each library corresponds to a particular theme and the entries within each library are designed under a particular DPI.

As was just illustrated, it is to be appreciated that a most appropriate bitmap among the library of bitmaps may not have a 1:1 relationship with the DPI to DPI ratio. Accordingly, as will be discussed in further detail below, the chosen bitmap can be further adjusted so as to approach or achieve the 1:1 relationship. For example, if the DPI to DPI ratio is 300:96 which equates to 3.125, and among the library are two bitmaps having respective values of 3 and 4, the bitmap having the value closest to but less than the actual ratio is selected and then subsequently stretched to achieve or approach the actual ratio. In this particular example, the bitmap having value of 3 would be selected and then stretched/sized to approach or achieve a value of 3.125. Thus, this aspect of the present invention provides for storing N number of bitmaps (N being an integer) and selecting a most appropriate one of the bitmaps, which corresponds to a desired DPI to DPI ratio. The invention can also provide for scaling the selected bitmap to approach or achieve the DPI to DPI ratio.

Figure 6:
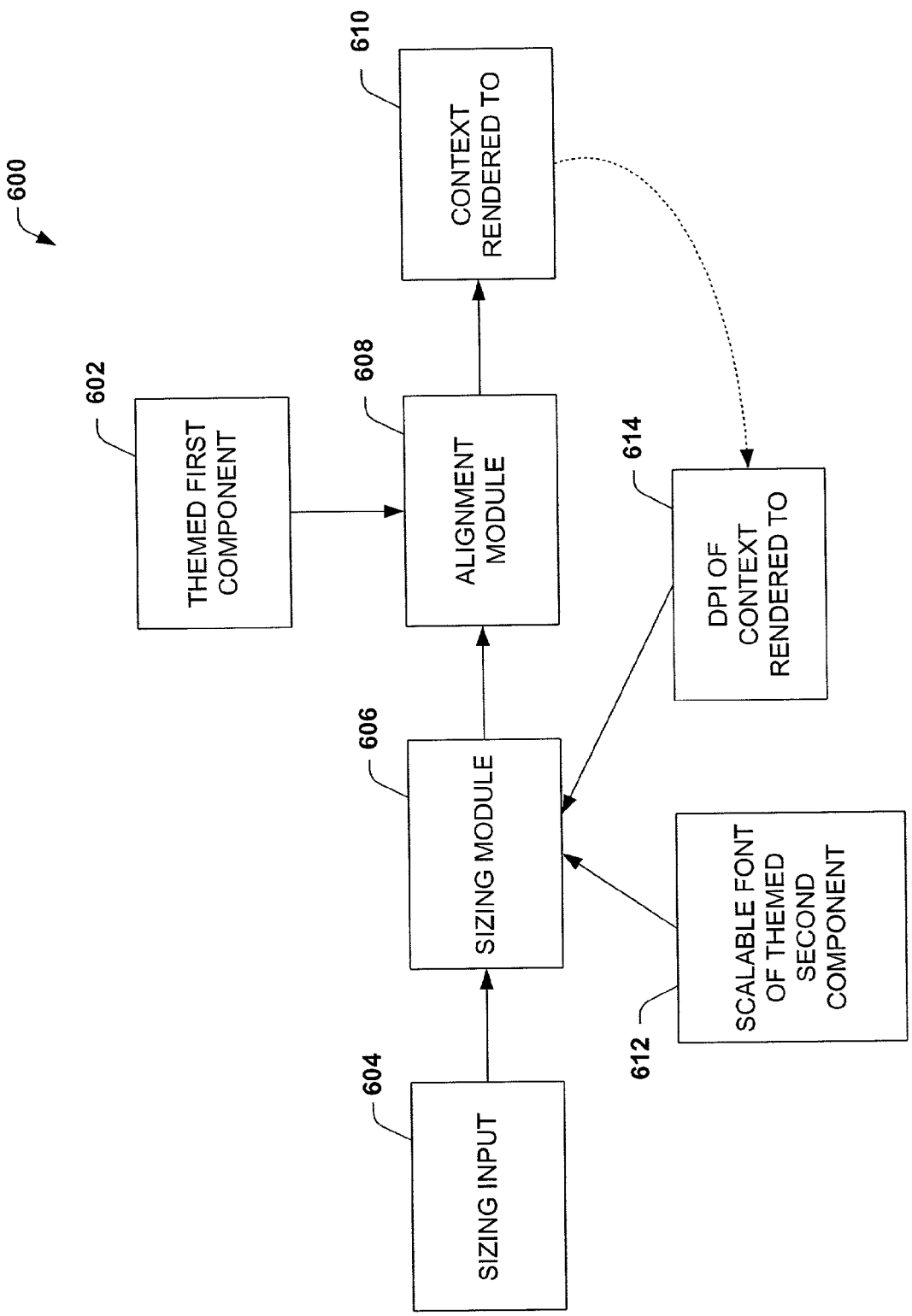
FIG. 6 a is block diagram illustrating a system for sizing a UI element in accordance with yet another aspect of the present invention.

With reference now to FIG. 6, a system 600 is schematically illustrated for rendering an appropriately sized themed UI element utilizing a scalable font. More particularly, a scalable font is used to represent a themed second component 612 which can be inserted into a themed first component 602 to form a themed UI element. The scalable font defines the themed second component 612 in terms of one or more outlines that are created by a set of points interconnected by a series of lines and curves. The scalable font is a template or mathematical outline of the second component. The outlines are formed according to a set of instructions which defines which points are interconnected and in what order and by what type of line or curve. Executable subroutines known as hints can also be associated with the font to adjust the outlines based upon the scaled size of component.

The scalable font is provided to a sizing module 606 as is the DPI 614 of the context 610 being rendered to. Sizing input 604 is also provided to the sizing module. The sizing input 604 can be any type of input that affects the size of the UI element. The sizing input 604 may, for example, result from configuration related activities, such as where a control panel is accessed to adjust certain settings.

Software, such as a rasterizer program, is used in the sizing module 606 to create the appropriately sized themed second component from the scalable font. The sizing module uses a first part of a rasterizer program, known as an interpreter, to interpret or follow the instructions to draw the second component. The interpreter draws the second component in accordance with the sizing input as well as the DPI of the context being rendered to. In this fashion, the themed second component is appropriately scaled according to the sizing input as well as the DPI of the context being rendered to. Depending upon the sizing input and the DPI of the context being rendered to, the sizing module can also execute hinting subroutines which adjust the outlines of the themed second component in a fashion so as to preserve and improve its appearance.

The sizing module 606 then uses a second part of the rasterizer program, known as a scan converter to convert the outline of the second component into a bitmap. The scan converter superimposes a grid over the outline of the component. Values are assigned to the dots within the bitmap according to those pixels within the context 610 that should be turned on in order to render the component on the context.

Once the appropriately sized themed second component is obtained, it is provided to an alignment module 608. An appropriately themed first component 602 of the UI element is also provided to the alignment module 608. The alignment module 608 inserts and aligns the sized second component within the first component 602. The alignment module 608 can align the second component within the first component 602 in any number of ways. For example, the alignment component can align the second component within the first component 602 by utilizing horizontal and vertical alignment properties which control the horizontal and vertical alignment, respectively, of the second component relative to the margins of the themed first component 602.

So that the UI element has a desired look and feel, the first and second components may very well have corresponding, or at least complimentary, themes. However, it is to be appreciated that for the purposes of the present invention, the components described herein can have one or more themes or no themes. Additionally, the components need not have corresponding, or even complimentary themes. Rather, the themes can have divergent themes. Essentially, the present invention is not to be limited by the theming of the components that make up the UI element.

When the alignment module 608 aligns and inserts the themed second component within the themed first component 602, the appropriately sized themed UI element is generated and is sent to the context 610 that it is to be rendered to. Since the scaled second component is drawn from a mathematical template which takes into account user sizing input and the DPI of the context being rendered to and is then converted to a bitmap which is aligned within the first component to form the UI element, the appropriately sized themed UI element is rendered to the context with the effect of pixelation and/or disproportionate appearances mitigated. It is to be appreciated that the present invention anticipates more than just first and second components making up the UI element. Accordingly, the present invention anticipates any number of scalable fonts that can be scaled in accordance with user input and the DPI of the context being rendered to.

Figure 7:
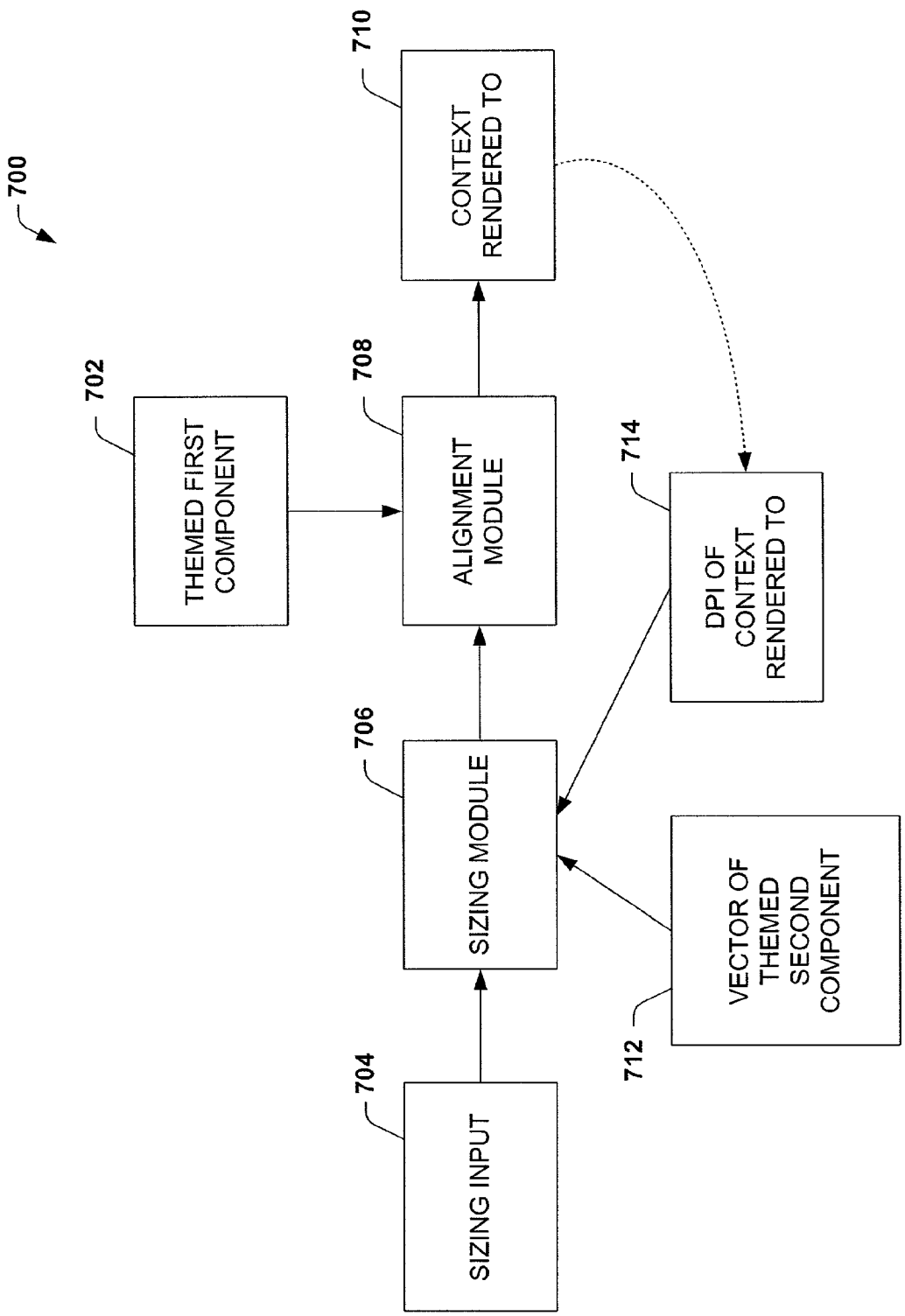
FIG. 7 a is block diagram illustrating a system for sizing a UI element in accordance with still another aspect of the present invention.

With reference now to FIG. 7, a system 700 is schematically illustrated for rendering an appropriately sized themed UI element utilizing a vector. More particularly, a vector is used to represent a themed second component 712 which can be inserted into a themed first component 702 to form a themed UI element. A vector is a mathematical and/or geometric formulas that defines a character or image. Generally speaking, to scale a vector based image, only the coefficients of the geometric formula for that image need to be changed. Additional commands can also be associated with the formula for the vector of the themed second component. These additional commands can control aspects, such as the shade, color, and/or gradient (e.g. transition between one or more colors) that can affect the theme of the component.

In accordance with this aspect, the vector of the themed second component is provided to a sizing module 706 as is the DPI 714 of the context 710 being rendered to. Sizing input 704 is also provided to the sizing module. The sizing input 704 can be any suitable type of input that affects the size of the UI element. The sizing module adjusts the formula, or more appropriately the coefficients therein, that define the second component in accordance with the sizing input and the DPI of the context being rendered to. Because the equation that defines the vector based second component is adjusted, the second component experiences little or no loss of resolution. The sizing module can then use software, such as part of a rasterizer program, known as a scan converter to convert the outline of the second component into a bitmap so that the second component is renderable to a context.

Once the appropriately sized themed second component is obtained, it is provided to an alignment module 708. An appropriately themed first component 702 of the UI element is also fed into the alignment module 708. The alignment module 708 inserts and aligns the sized second component within the first component 702. The alignment module 708 can align the second component within the first component 702 in any number of ways. For example, the alignment component can align the second component within the first component 702 by utilizing horizontal and vertical alignment properties which control the horizontal and vertical alignment, respectively, of the second component relative to the margins of the first component 702.

So that the UI element has a desired look and feel, the first and second components may very well have corresponding, or at least complimentary, themes. However, it is to be appreciated that for the purposes of the present invention, the components described herein can have one or more themes or no themes. Additionally, the components need not have corresponding, or even complimentary themes. Rather, the themes can have divergent themes. Essentially, the present invention is not to be limited by the theming of the components that make up the UI element.

When the alignment module 708 aligns and inserts the themed second component within the themed first component 702, the appropriately sized themed UI element is generated and is sent to the context 710 that it is to be rendered to. Since the scaled second component is drawn from an equation which is adjusted in accordance with user input and the DPI of the context being rendered to and is then aligned within the first component to form the UI element, the appropriately sized themed UI element is rendered to the context with the effect of pixelation and/or disproportionate appearances mitigated. It is to be appreciated that the present invention anticipates more than just first and second components making up the UI element. Accordingly, the present invention anticipates any number of vectors that can be scaled in accordance with user input and the DPI of the context being rendered to.

In view of the foregoing graphical, structural and functional features described above, methodologies in accordance with various aspects of the present invention will be better appreciated with reference to FIGS. 8–12. While, for purposes of simplicity of explanation, the methodologies of FIGS. 8–12 are shown and described as occurring serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodologies may be implemented as computer-executable instructions, such as software stored in a computer-readable medium. Alternatively, the methodology may be implemented as hardware or a combination of hardware and software.

Figure 8:
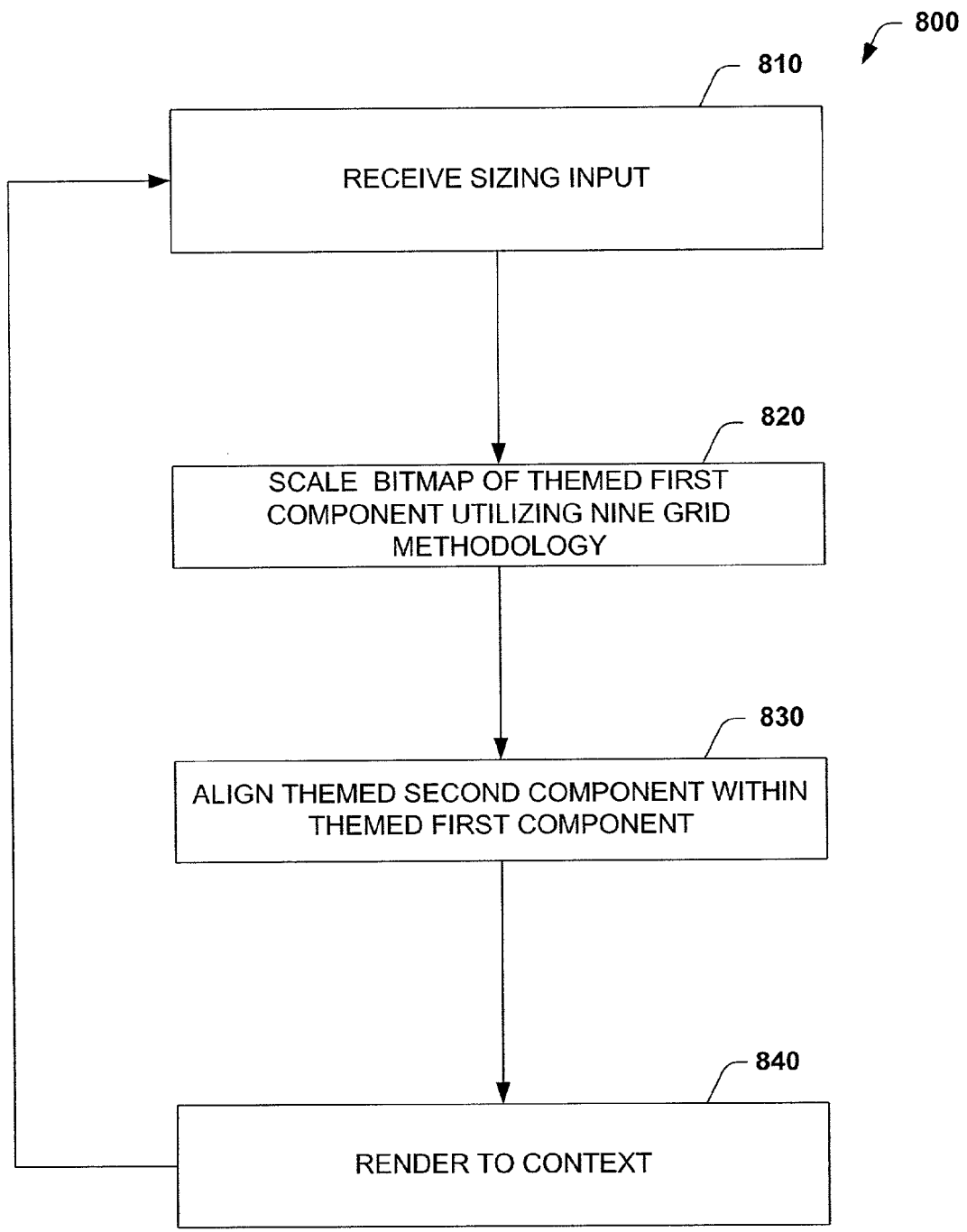
FIG. 8 is a flow diagram illustrating a sizing methodology for sizing a themed UI element in accordance with one aspect of the present invention, and more particularly with the system illustrated in FIG. 1.

Referring now to FIG. 8, a flow diagram 800 is illustrated for a sizing methodology for sizing a themed UI element in accordance with one aspect of the present invention. The process is initiated at 810 wherein sizing input is received. After the sizing input is received, the process proceeds to 820 wherein a bitmap of a uniform themed first component is scaled. The first component can be scaled by dividing the bitmap into nine sections and adjusting the margins of those sections such that different sections of the bitmap are adjusted differently. After the uniform themed first component is scaled, the process proceeds to 830 wherein the themed second component is aligned within a themed first component. After the second component is aligned within the first component, the process proceeds to 840 wherein the UI element is rendered to the context. After 840, the process returns to 810 to once again receive sizing input.

Figure 9:
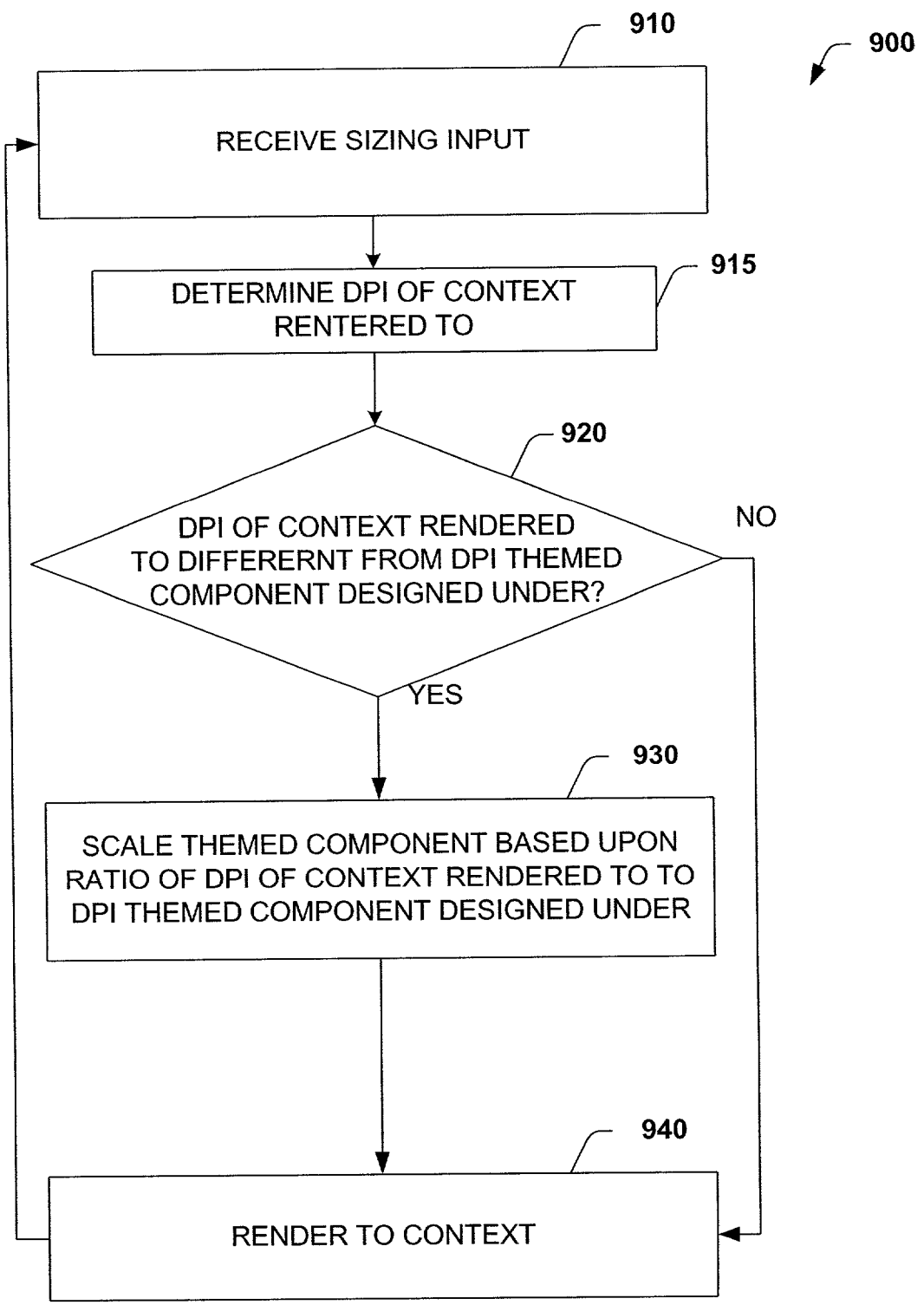
FIG. 9 is a flow diagram illustrating a sizing methodology for sizing a themed UI element in accordance with one aspect of the present invention, and more particularly with the system illustrated in FIG. 3.

Turning now to FIG. 9, a flow diagram 900 is illustrated for a sizing methodology for sizing a themed component in accordance with another aspect of the present invention and in particular when the DPI of the context being rendered to differs from the DPI that the component was designed under. The process begins at 910 wherein sizing input is received. After 910, the process proceeds to 915 wherein the DPI of the context being rendered to is determined. After 915, the process proceeds to 920 wherein a decision is made whether the DPI of the context rendered to is different from the DPI that the themed component was designed under. If the decision in 920 is affirmative, the process proceeds to 930 wherein the themed component is scaled. The component can be scaled based upon the ratio of the DPI of the context being rendered to to the DPI that the themed component was designed under. The first component can be scaled by dividing the bitmap into nine sections and adjusting the margins of those sections such that each of the sections of the bitmap are adjusted in both the X and Y directions. After 930, the process proceeds to 940 wherein the themed component is rendered to the context. If the decision in 920 is negative, the process immediately proceeds to 940 and the component is rendered to the context. After 940, the process returns to 910 to once again receive sizing input.

Figure 10:
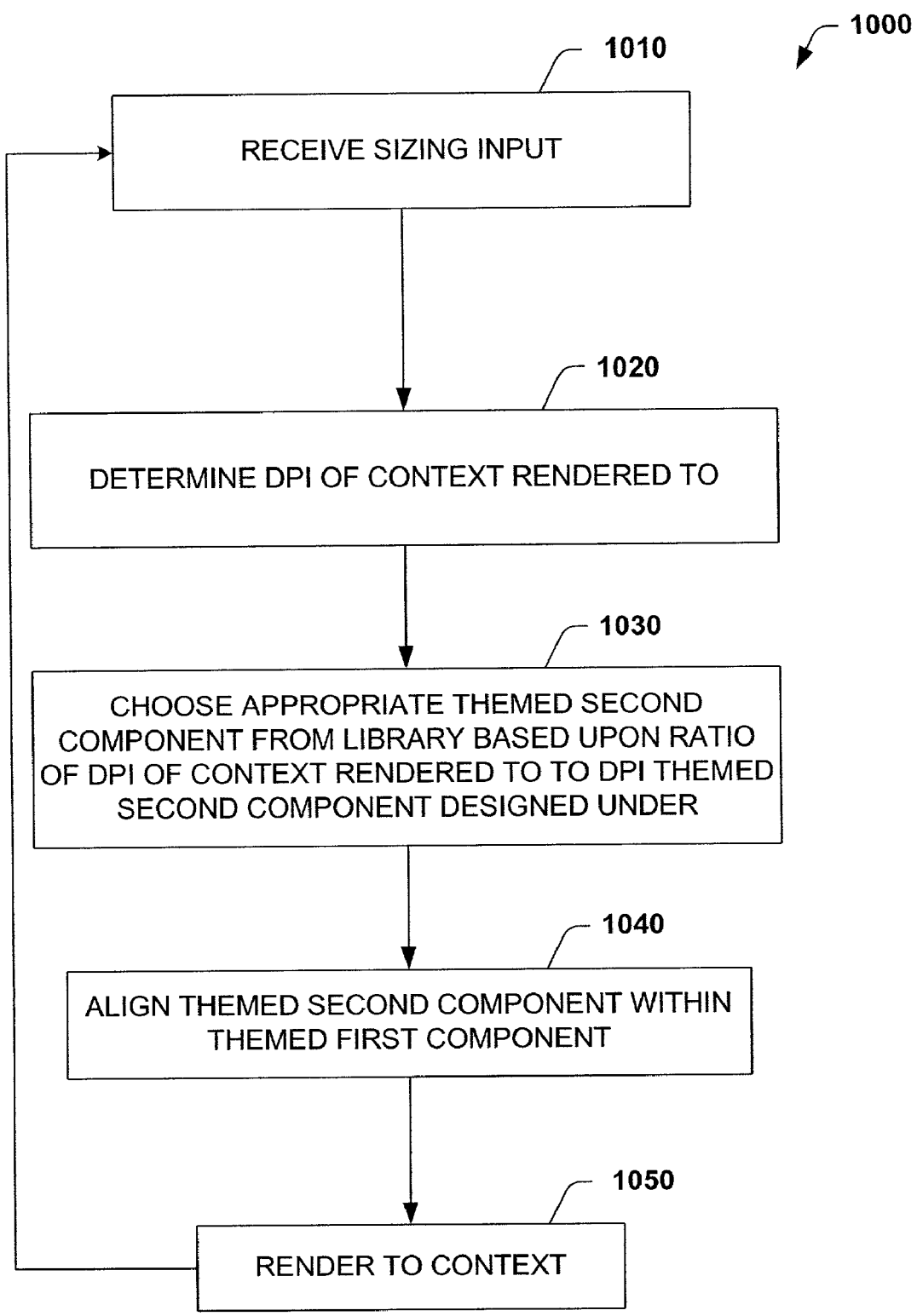
FIG. 10 is a flow diagram illustrating a sizing methodology for sizing a themed UI element in accordance with one aspect of the present invention, and more particularly with the system illustrated in FIG. 5.

With reference to FIG. 10, a flow diagram 1000 is illustrated for a sizing methodology for sizing a themed UI element in accordance with yet another aspect of the present invention and in particular when the DPI of the context being rendered to differs from the DPI that a component of the UI element was designed under. The process begins at 1010 wherein sizing input is received. After 1010, the process proceeds to 1020 wherein the DPI of the context being rendered to is determined. The process then proceeds to 1030 wherein the appropriate size of a themed second component is chosen from a library of differently sized correspondingly themed second components. The choice can be based upon the ratio of the DPI of the context being rendered to to the DPI that each of the entries within the library were designed under. After 1030, the process proceeds to 1040 wherein the themed second component is aligned within a themed first component. The process then proceeds to 1050 wherein the themed UI element is rendered to the context. After 1050, the process returns to 1010 to once again receive sizing input.

Figure 11:
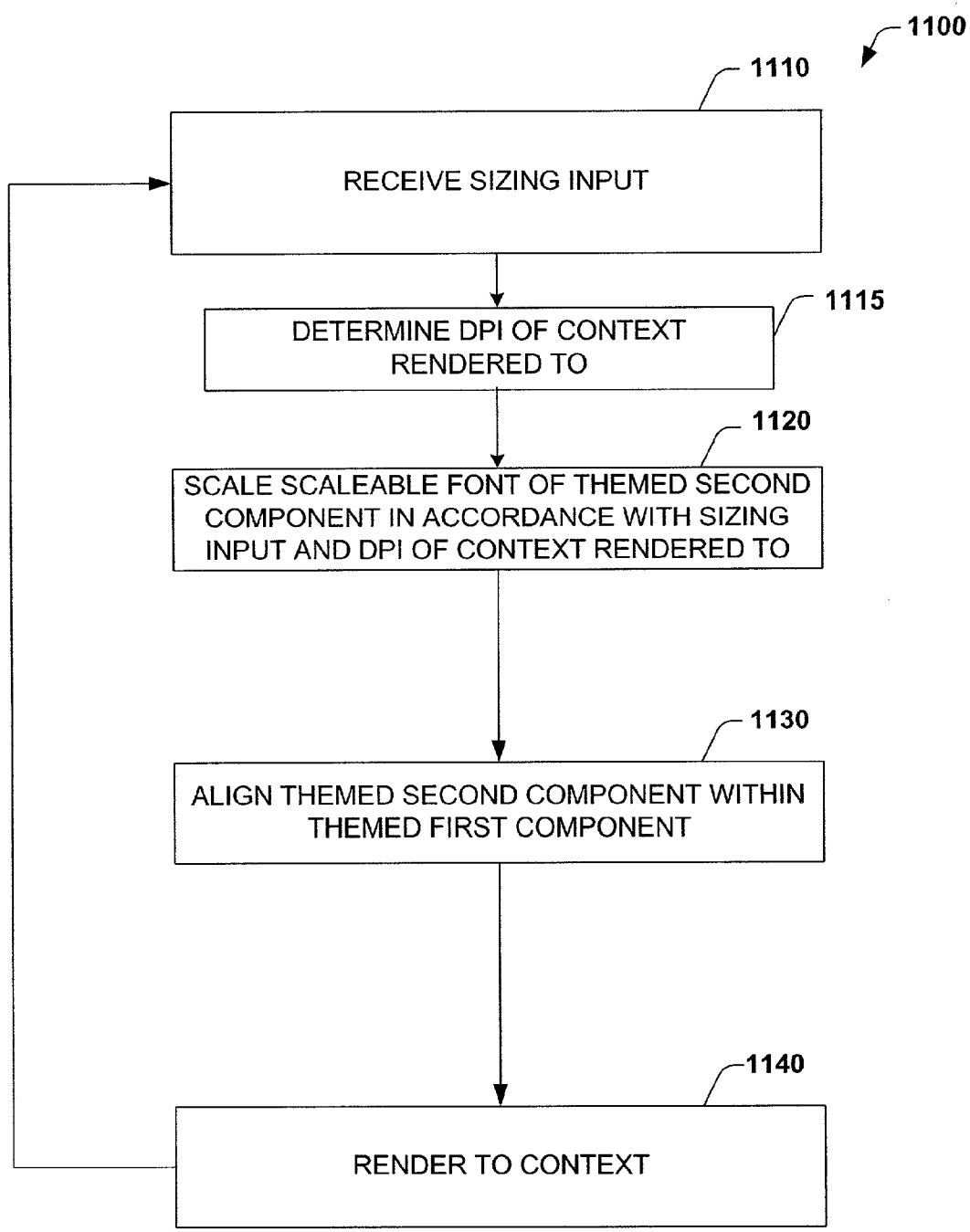
FIG. 11 is a flow diagram illustrating a sizing methodology for sizing a themed UI element in accordance with one aspect of the present invention, and more particularly with the system illustrated in FIG. 6.

Turning to FIG. 11, a flow diagram 1100 is illustrated for a sizing methodology for sizing a themed UI element in accordance with another aspect of the present invention and in particular with a scalable font. The process is initiated 1110 wherein the sizing input is received. After the sizing input is received, the process proceeds to 1115 wherein the DPI of the context being rendered to is determined. The process then proceeds to 1120 wherein the scalable font of the themed second component is scaled in accordance with the sizing input and the DPI of the context being rendered to. The scalable font can be scaled utilizing a raterization program. After the themed second component is scaled, the process proceeds to 1130 wherein the themed second component is aligned within a themed first component. After the second component is aligned within the first component, the process proceeds to 1140 wherein the UI element is rendered to the context. After 1140, the process returns to 1110 to once again receive sizing input.

Figure 12:
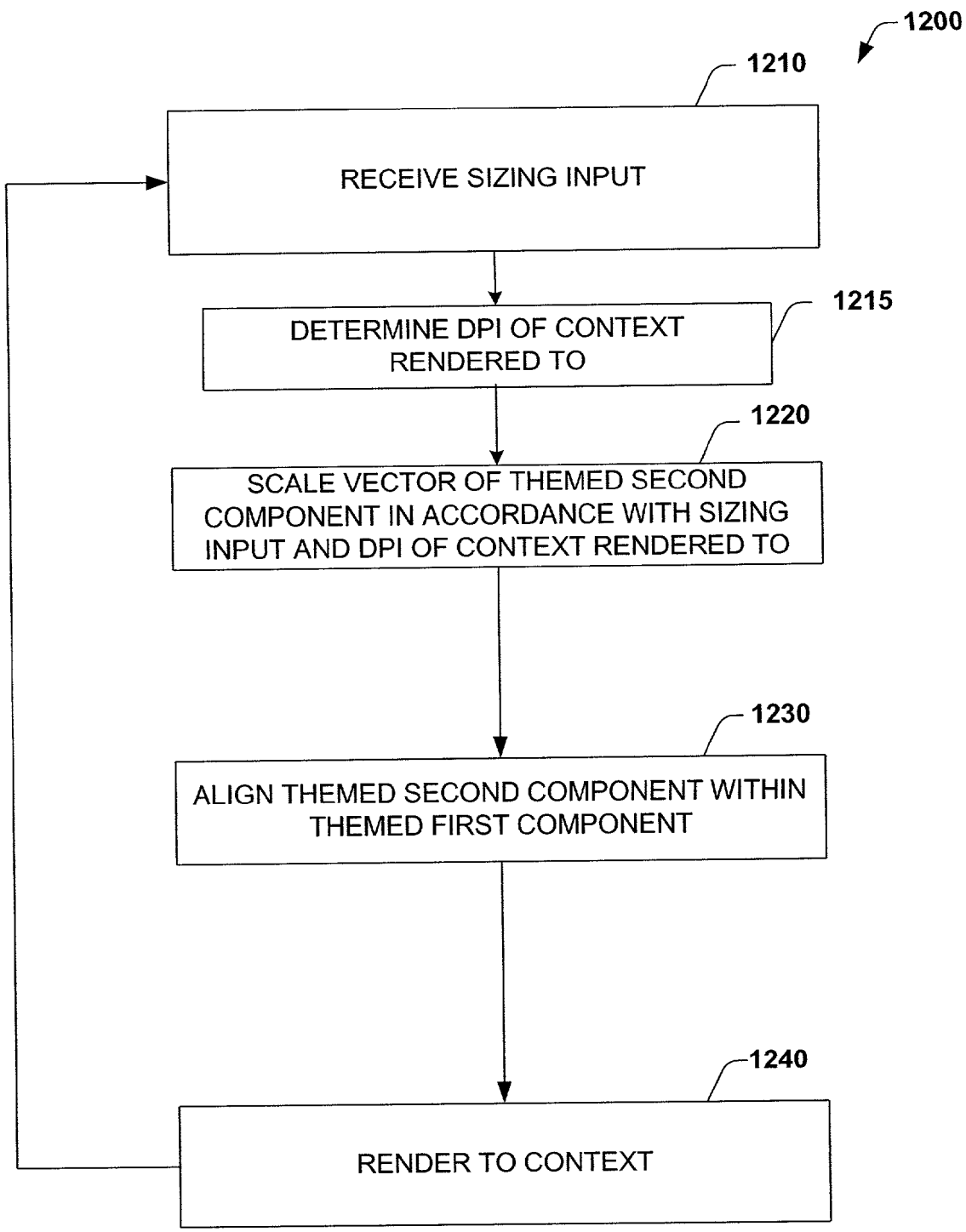
FIG. 12 is a flow diagram illustrating a sizing methodology for sizing a themed UI element in accordance with one aspect of the present invention, and more particularly with the system illustrated in FIG. 7.

Turning now to FIG. 12, a flow diagram 1200 is illustrated for a sizing methodology for sizing a themed UI element component in accordance with another aspect of the present invention and in particular with a vector. The process begins at 1210 wherein sizing input is received. After 1210, the process proceeds to 1215 wherein the DPI of the context being rendered to is determined. The process then proceeds to 1220 wherein the vector of the themed second component is scaled in accordance with the sizing input and the DPI of the context being rendered to. After the themed second component is scaled, the process proceeds to 1230 wherein the themed second component is aligned within a themed first component. After the second component is aligned within the first component, the process proceeds to 1240 wherein the UI element is rendered to the context. After 1240, the process returns to 1210 to once again receive sizing input.

It is to be appreciated that any one or more of the aspects of the present invention disclosed herein may be used in conjunction with any other aspect of the present invention. For instance, the sizing module 106 discussed with reference to FIG. 1, which sizes a uniform themed bitmap by dividing the bitmap into nine sections and adjusting the margins of those sections differently may be used in conjunction any of the other systems disclosed herein when those systems include a uniform bitmap of an image. The sizing module 106 may, for example, be used to size the themed first components 502, 602, 702 of FIGS. 5, 6, 7, respectively, if those component 502, 602, 702 happen to be uniform bitmap images. Similarly, the sizing module 106 may, be used to refine the size of a chosen bitmap from the library disclosed in FIG. 5 if the chosen bitmap happens to be a uniform bitmap image. Moreover, the themed second component 112 shown in FIG. 1 can be sized with this module 106 if that component 112 happens to be a uniform bitmap image.

Likewise, the sizing module 306 discussed with reference to FIG. 3, which sizes a non-uniform bitmap of an image that was designed under a DPI different from the DPI of the context that the image is rendered to by dividing the bitmap into nine sections and adjusting the margins of those sections so as to adjust the size of each of those sections in both the horizontal and vertical directions, can be used to size the themed second component 112 shown in FIG. 1 if that component 112 happens to be a non-uniform bitmap image that was designed under a DPI different from the DPI of the context that it is being rendered to. Similarly, the themed first components 502, 602, 702 of FIGS. 5, 6, 7, respectively, can be sized with this module 306, if those component 502, 602, 702 happen to be non-uniform bitmap images that were designed under a DPI different from the DPI of the context that they are being rendered to. This sizing module 306 may also be used to further refine the size of a chosen bitmap from the library disclosed in FIG. 5 if the bitmap chosen from the library happens to be a non-uniform bitmap image.

It is to be appreciated that the present invention is adapted to limit how much a themed UI element can be scaled. This is done so that themed images are not scaled too much or too little. For instance, each of the three UI elements 1310, 1320, 1330 in the reduced widow illustrated in FIG. 13 have been reduced in size in proportion to the reduction in the size of the window. However, they have been reduced to such a degree that they may no longer be visible to a user. Accordingly, the present invention will only allow a themed UI element to be scaled up or down a finite amount. For instance, as illustrated in FIG. 14, a plot of window size versus the amount of scaling that is done to themed UI elements in accordance with the present invention shows that the UI elements are no longer scaled after the window is sized past certain thresholds, namely points A & B. The window size is plotted on the Y-axis and the degree of scaling done to the themed UI elements in accordance with the present invention is plotted on the X-axis. At point A, no matter how much smaller the window gets, the size of the UI element is no longer decreased. Similarly, at point B, no matter how much larger the window gets, the size of the UI element is no longer increased. This prevents the size of themed UI elements from affecting their functionality (e.g. prohibiting a user from minimizing or closing a window with them).

Figure 15:
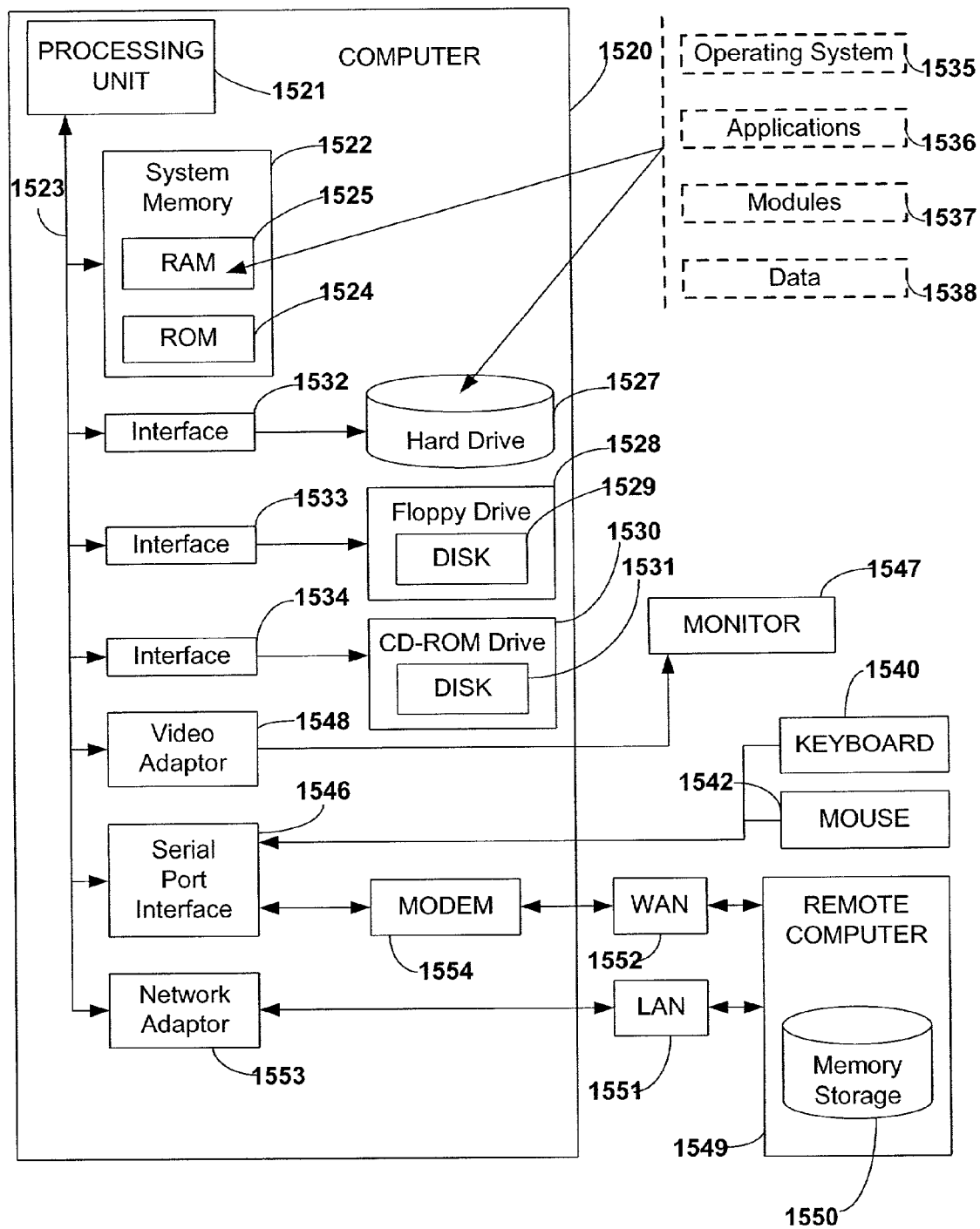
FIG. 15 is a block diagram illustrating a suitable operating environment in accordance with the present invention.
Figure 16:
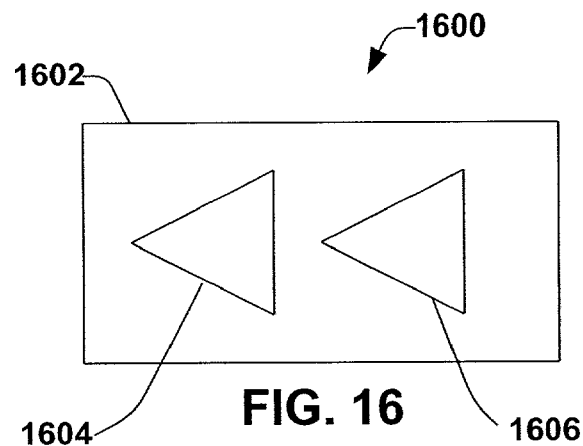
FIG. 16 is a representation of a UI element designed to be a rewind button and having a plain theme.
Figure 17:
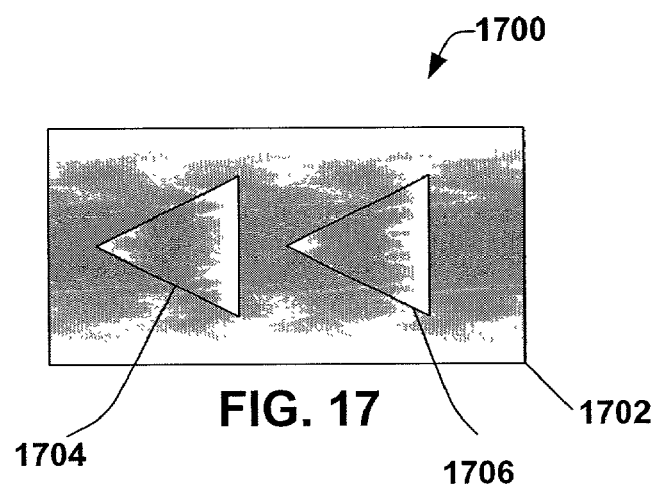
FIG. 17 is a representation of a UI element designed to be a rewind button, but having different theme.
Figure 20:
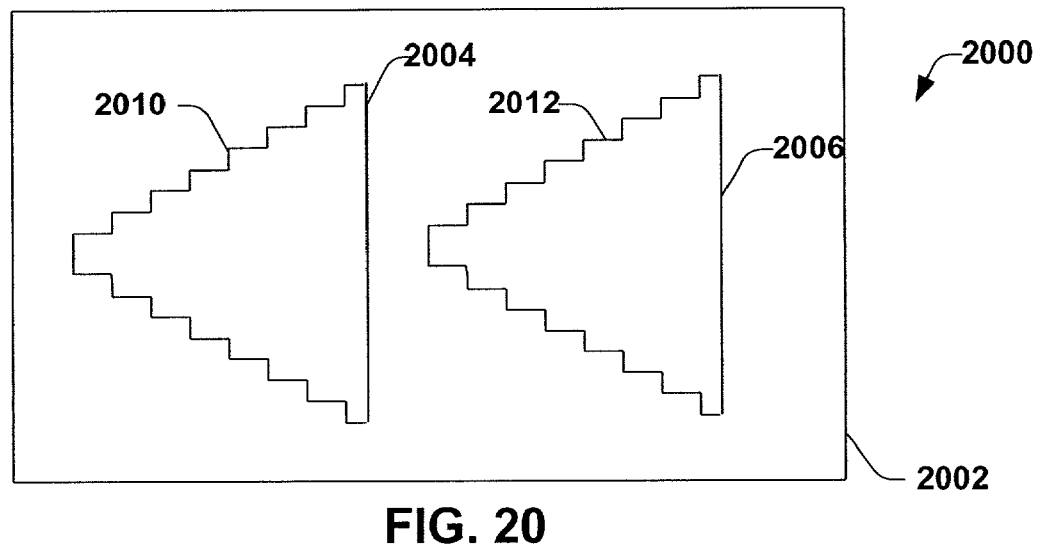
FIG. 20 is an illustration of a UI element increased in size to show the effect of pixelation.
Figures 18, 19:
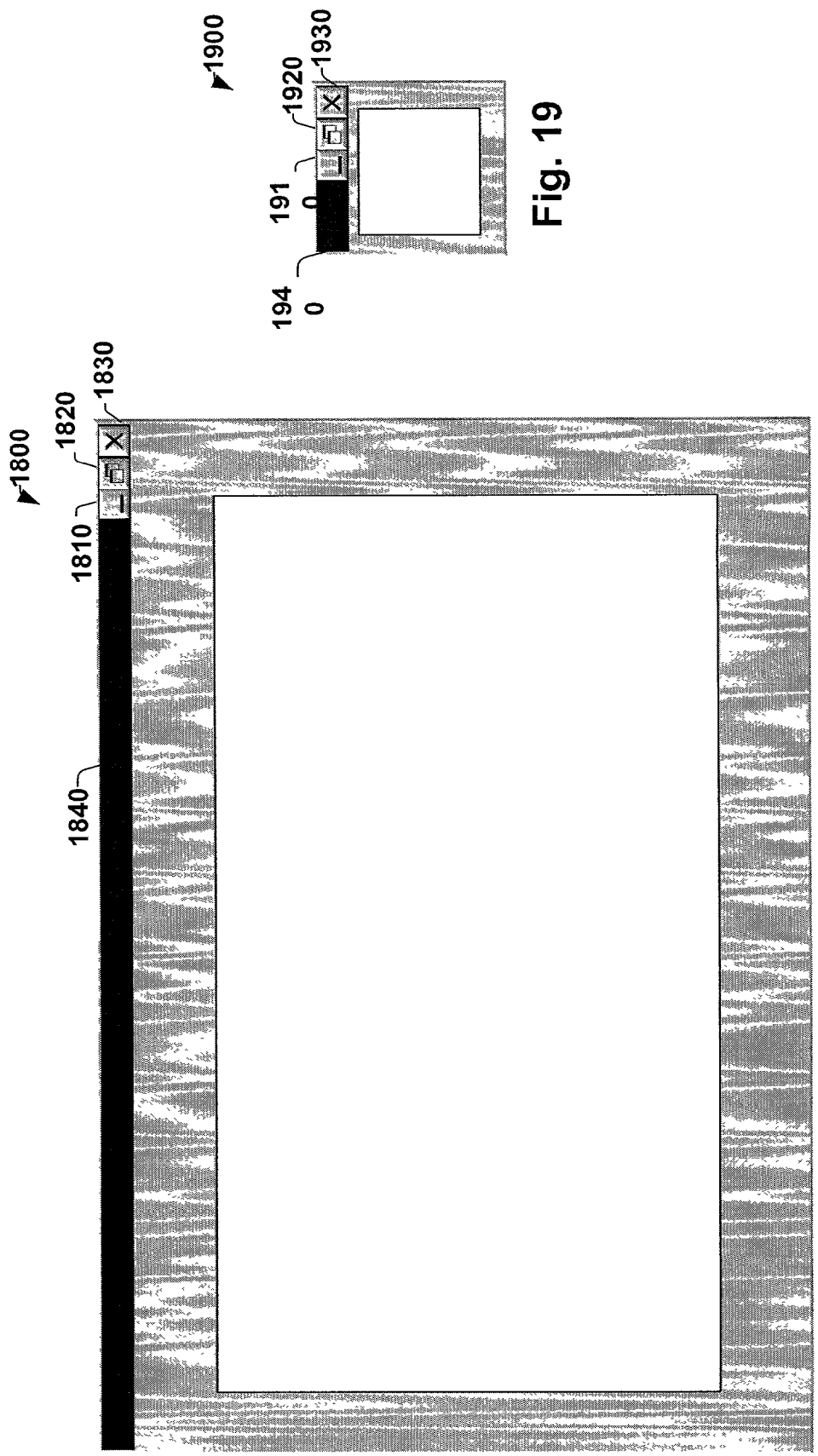
FIG. 18 is a representation of a window displayable on a computer monitor not significantly reduced in size.
FIG. 19 is a representation of a window displayable on a computer monitor significantly reduced in size.
Figure 21:
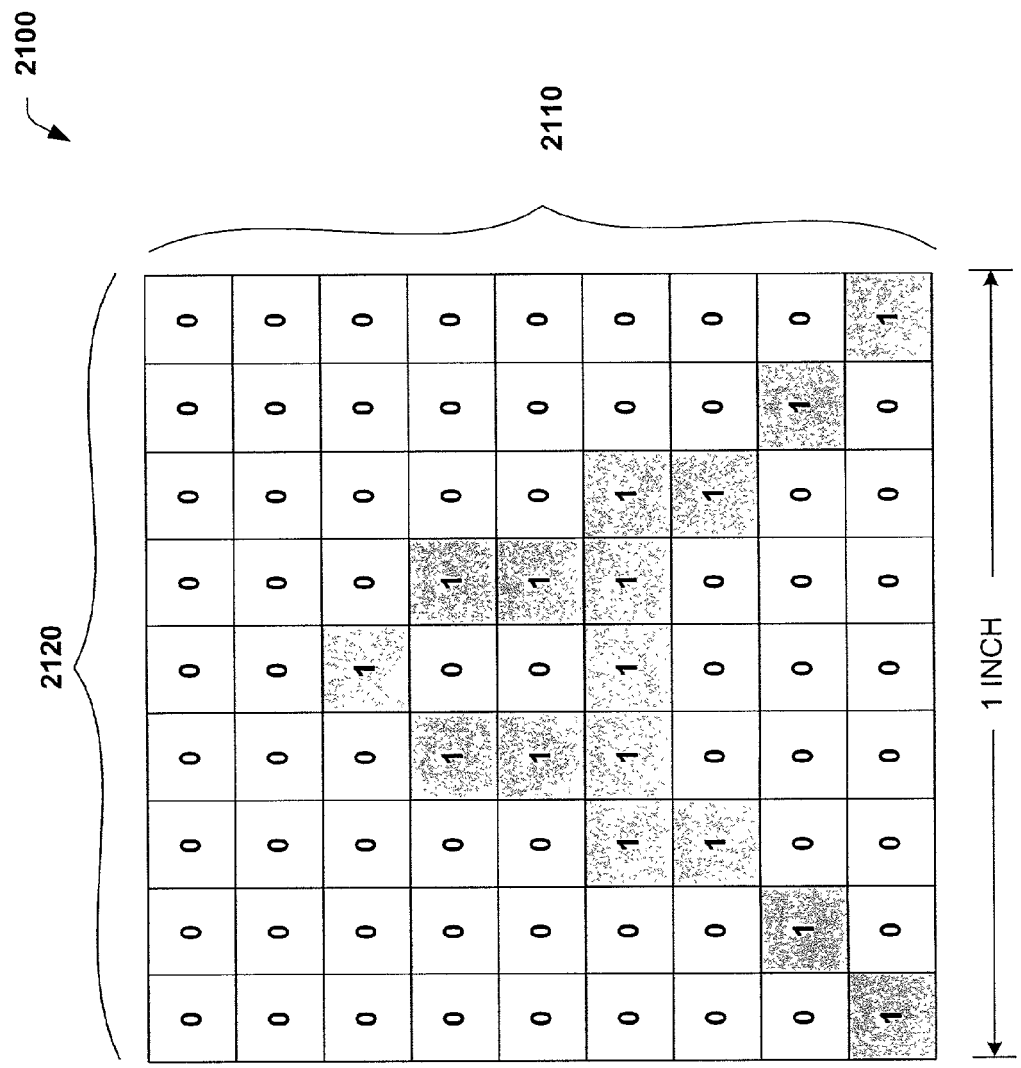
FIG. 21 is an illustration of a bitmap that is showing the letter A.
Figure 22:
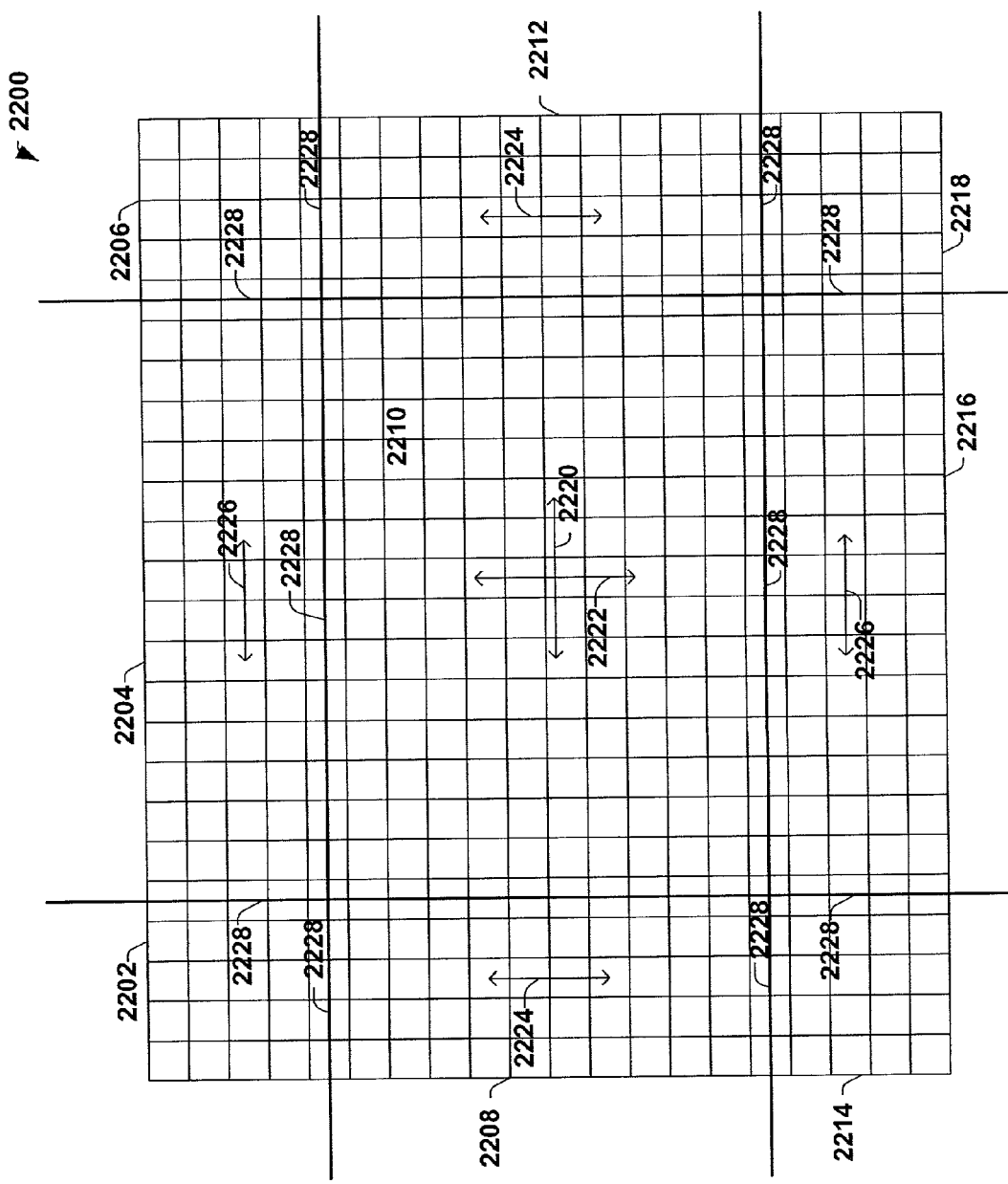
FIG. 22 is a bitmap that is divided into sections for purposes of illustrating sizing of the bitmap.

With reference to FIG. 15, an exemplary system for implementing the invention includes a conventional personal or server computer 1520, including a processing unit 1521, a system memory 1522, and a system bus 1523 that couples various system components including the system memory to the processing unit 1521. The processing unit may be any of various commercially available processors. Dual microprocessors and other multi-processor architectures also can be used as the processing unit 1521.

The system bus may be any of several types of bus structure including a memory bus or memory controller, a peripheral bus, and a local bus using any of a variety of commercially available bus architectures. The system memory includes read only memory (ROM) 1524 and random access memory (RAM) 1525. A basic input/output system (BIOS), containing the basic routines that help to transfer information between elements within the computer 1520, such as during start-up, is stored in ROM 1524.

The computer 1520 further includes a hard disk drive 1527, a magnetic disk drive 1528, e.g. to read from or write to a removable disk 1529, and an optical disk drive 1530, e.g. for reading a CD-ROM disk 1531 or to read from or write to other optical media. The hard disk drive 1527, magnetic disk drive 1528, and optical disk drive 1530 are connected to the system bus 1523 by a hard disk drive interface 1532, a magnetic disk drive interface 1533, and an optical drive interface 1534, respectively. The drives and their associated computer-readable media provide nonvolatile storage of data, data structures, computer-executable instructions, etc. for the server computer 1520. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment. A number of program modules may be stored in the drives and RAM 1525, including an operating system 1535, one or more application programs 1536, other program modules 1537 and program data 1538.

A user may enter commands and information into the computer 1520 through a keyboard 1540 and pointing device, such as a mouse 1542. Other input devices (not shown) may include a microphone, joystick, game pad, satellite dish, scanner, or the like. These and other input devices are often connected to the processing unit 1521 through a serial port interface 1546 that is coupled to the system bus, but may be connected by other interfaces, such as a parallel port, game port or a universal serial bus (USB). A monitor 1547 or other type of display device is also connected to the system bus 1523 via an interface, such as a video adapter 1548. In addition to the monitor, computers typically include other peripheral output devices (not shown), such as speakers and printers.

The computer 1520 may operate in a networked environment using logical connections to one or more remote computers, such as a remote server or client computer 1549. The remote computer 1549 may be a workstation, a server computer, a router, a peer device or other common network node, and typically includes many or all of the elements described relative to the computer 1520, although only a memory storage device 1550 has been illustrated in FIG. 15. The logical connections depicted in FIG. 15 include a local area network (LAN) 1551 and a wide area network (WAN) 1552. Such networking environments are commonplace in offices, enterprise-wide computer networks, intranets and the Internet.

When used in a LAN networking environment, the computer 1520 is connected to the local network 1551 through a network interface or adapter 1553. When used in a WAN networking environment, the server computer 1520 typically includes a modem 1554, or is connected to a communications server on the LAN, or has other means for establishing communications over the wide area network 1552, such as the Internet. The modem 1554, which may be internal or external, is connected to the system bus 1523 via the serial port interface 1546. In a networked environment, program modules depicted relative to the computer 1520, or portions thereof, may be stored in the remote memory storage device. It will be appreciated that the network connections shown are exemplary and other means of establishing a communications link between the computers may be used.

In accordance with practices of persons skilled in the art of computer programming, the present invention has been described with reference to acts and symbolic representations of operations that are performed by the computer 1520, unless indicated otherwise. Such acts and operations are sometimes referred to as being computer-executed. It will be appreciated that the acts and symbolically represented operations include the manipulation by the processing unit 1521 of electrical signals representing data bits which causes a resulting transformation or reduction of the electrical signal representation, and the maintenance of data bits at memory locations in the memory system (including the system memory 1522, hard drive 1527, floppy disks 1529, and CD-ROM 1531) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and several particular examples, however, it is to be appreciated that various programming methodologies and/or computer architectures suitable for carrying out the present invention may be employed and are intended to fall within the scope of the hereto appended claims.

What has been described above are preferred aspects of the present invention. It is, of course, not possible to describe every conceivable combination of aspects, components and/or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that sizes a user interface (UI) element having at least one component in response to a sizing input comprising:
   a sizing module that sizes a first component in response to the sizing input, the sizing module capable of sizing one or more disparate sections of the first component asymmetrically in at least two axes, the sizing module mitigates pixilation and disproportionate appearance of the first component; and
   an alignment module that aligns a second component within the sized first component.

2. The system of claim 1, the UI element is themed.

3. The system of claim 1, the first component is a bitmap and the sizing module divides the bitmap into a plurality of grids and adjusts margins of at least some of the grids to size at least some of grids of the bitmap.

4. A method for sizing a UI element having at least one component in response to a sizing input comprising:
   receiving the sizing input, the sizing input includes an unsymmetrical sizing factor for one or more sections of a bitmapped first component;
   dividing the bitmapped first component into a plurality of grids;
   adjusting the margins of at least some of the grids to size at least some of the grids of the bitmap in response to the sizing input; and
   aligning a second component within the sized first component to mitigate pixilation and inconsonant appearance of the UI element.

5. The method of claim 4, the UI element is themed.

6. A computer-readable medium storing computer-executable instructions that performs the method of claim 4.

7. In a computer system having a graphical user interface including a context that a UI element can be rendered to, a method for rendering a UI element having at least one component that is sized in response to sizing input comprising:
   receiving the sizing input;
   dividing a bitmapped first component into a plurality of grids;
   asymmetrically adjusting margins of at least some of the grids to size at least some of the grids of the bitmap in response to the sizing input;
   curbing pixilation and disproportionate representation of the bitmapped first component;
   aligning a second component within the sized first component; and
   rendering the UI element to the context.

8. The method of claim 7, the UI element is themed.

9. A system that sizes a bitmapped component of a UI element in response to a sizing input, where the bitmapped component was designed under a particular DPI, the system comprising:
   a sizing module that sizes and prevents pixilation and disproportionate appearance of the bitmapped component in response to the sizing input and based upon a functional relationship between the DPI of the context that the UI element is being rendered to and the DPI that the bitmapped component was designed under, the sizing module capable of rendering nonsymmetrical representations of at least one individual sector of the bitmapped component.

10. The system of claim 9, the UI element is themed.

11. The system of claim 9, the sizing module divides the bitmapped component into a plurality of grids and adjusts the size of the grids to size the component.

12. The system of claim 11, the sizing module adjusts margins of the grids to adjust the size of the grids.

13. The system of claim 12, the sizing module adjusts the margins of the grids based upon the functional relationship between the DPI of the context that the UI element is being rendered to and the DPI that the bitmapped component was designed under.

14. The system of claim 11, the sizing module adjusts the margins of the grids such that the size of each of the grids is adjusted in both the horizontal and vertical directions.

15. The system of claim 14, the functional relationship between the DPI of the context that the UI element is being rendered to and the DPI that the bitmapped component was designed under is the ratio of the DPI of the context that the UI element is being rendered to and the DPI that the bitmapped component was designed under.

16. A method for sizing a bitmapped component of a UI element in response to sizing input, where the bitmapped component was designed under a particular DPI, the method comprising:
   receiving the sizing input that comprises at least one asymmetrical sizing multiplier for one or more individuated sectors of the bitmapped component; and
   sizing the bitmapped component in response to sizing input and based upon a functional relationship between the DPI of the context that the UI element is being rendered to and the DPI that the bitmapped component was designed under, thereby curtailing pixilation and disproportionate appearance of the bitmapped component.

17. The method of claim 16, the UI element is themed.

18. The method of claim 16 further including:
   dividing the bitmap into a plurality of grids; and
   adjusting margins of the grids to adjust the size of the grids based upon the functional relationship between the DPI of the context that the UI element is being rendered to and the DPI that the bitmapped component was designed under.

19. The method of claim 18 further including:

adjusting the margins of the grids such that the size of each of the grids is adjusted in both the vertical and horizontal directions.

20. The method of claim 19 further including:

adjusting the margins of the grids based upon the ratio of the DPI of the context that the UI element is being rendered to the DPI that the bitmapped component was designed under.

21. A computer-readable medium storing computer-executable instructions that performs the method of claim 20.

22. In a computer system having a graphical user interface including a context that a UI element having a bitmap component can be rendered to, a method for rendering the UI element in response to sizing input where the bitmapped component was designed under a particular DPI, the method comprising:

receiving the sizing input; and asymmetrically sizing one or more areas of the bitmapped component in response to the sizing input and based upon a functional relationship between the DPI of the context that the UI element is being rendered to and the DPI that the bitmapped component was designed under, thereby mitigating disproportionate appearance and pixilation of the UI element.

23. The system of claim 22, the UI element is themed.

24. The method of claim 22 further including:

dividing the bitmap into a plurality of grids; and adjusting margins of the grids to adjust the size of the grids based upon the functional relationship between the DPI of the context that the UI element is being rendered to and the DPI that the bitmapped component was designed under.

25. The method of claim 24 further including:

adjusting the margins of the grids such that the size of each of the grids is adjusted in both the vertical and horizontal directions.

26. The method of claim 25 further including;

adjusting the margins of the grids based upon the ratio of the DPI of the context that the UI element is being rendered to and the DPI that the bitmapped component was designed under.

27. A system that produces a UI element having at least one component comprising:

a sizing module that chooses a second component of the UI element from a library of second components to minimize pixilation and discordant appearance of the second component; and an alignment module that aligns the chosen second component within a first component of the UI element.

28. The system of claim 27, the UI element is themed.

29. The system of claim 27, entries within the library are designed under a particular DPI, the sizing module chooses the second component from the library based upon a functional relationship between the DPI of the context that the UI element is being rendered to and the DPI that the entries within the library were designed under.

30. The system of claim 29, the sizing module chooses the second component from the library based upon the ratio of the DPI of the context that the UI element is being rendered to and the DPI that the entries within the library were designed under.

31. The system of claim 30 the sizing module refines the size of the chosen second component based upon the ratio of the DPI of the context that the UI element is being rendered to and the DPI that the entries within the library were designed under.

32. A method for producing a UI element having at least one component comprising:

choosing a second component of the UTI element from a library of second components to attenuate pixilation and to ensure consonant appearance of the UI element; and aligning the chosen second component within a first component of the UI element.

33. The method of claim 32, entries within the library are designed under a particular DPI, the method further including:

choosing the second component from the library based upon a functional relationship between the DPI of the context that the UI element is being rendered to and the DPI that the entries within the library were designed under.

34. The method of claim 33 further comprising:

choosing the second component from the library based upon the ratio of the DPI of the context that the UI element is being rendered to and the DPI that the entries within the library were designed under.

35. The method of claim 34 further comprising:

refining the size of the chosen second component based upon the ratio of the DPI of the context that the UI element is being rendered to and the DPI that the entries within the library were designed under.

36. A computer-readable medium having computer-executable instructions that performs the method of claim 32.

37. A computer-readable medium having computer-executable instructions that performs the method of claim 33.

38. In a computer system having a graphical user interface including a context that a UI element having at least one component can be rendered to, a method for rendering a UI element comprising:

choosing a second component of the UI element from a library of second components;

aligning the chosen second component within a first component of the UI element; and rendering the UI element to ensure minimal pixilation and to curtail disproportionate representation within the context.

39. The system of claim 38, the UI element is themed.

40. The method of claim 38, entries within the library are designed under a particular DPI, the method further including:

choosing the second component from the library based upon a functional relationship between the DPI of the context that the UI element is being rendered to and the DPI that the entries within the library were designed under.

41. The method of claim 40 further including:

choosing the second component from the library based upon the ratio of the DPI of the context that the UI element is being rendered to and the DPI that the entries within the library were designed under.

42. A system that produces a UI element having at least one component in response to sizing input comprising:

a sizing module that asymmetrically sizes one or more identified sections of a scalable font of a second component in response to the sizing input and based upon the DPI of a context that the UI element is being rendered to, the sizing module curtails pixilation and inconsonant depictions of the rendered UI element; and an alignment module that aligns the sized second component within a first component of the UI element.

43. The system of claim 42, the UI element is themed.

44. A system that produces a ULT element having at least one component in response to sizing input comprising:

a sizing module to size a vector of a second component of the UI element in response to the sizing input and based upon the DPI of a context that the UI element is being rendered to, the sizing module attenuates pixilation and incommensurate representation of the rendered UI element, the sizing input indicates nonsymmetrical sizing of at least one selected area of the second component; and an alignment module that aligns the sized second component within a first component of the UI element.

45. The system of claim 44, the UI element is themed.

* * * * *